(12) United States Patent
Hertel et al.

(10) Patent No.: US 12,267,319 B2
(45) Date of Patent: Apr. 1, 2025

(54) DEVICE-INDEPENDENT, CONTEXTUALLY DRIVEN APPLICATION COMPUTING ENVIRONMENT

(71) Applicant: Xperiel, Inc., Sunnyvale, CA (US)

(72) Inventors: Alexander Hertel, Sunnyvale, CA (US); Philipp Hertel, Belmont, CA (US)

(73) Assignee: Xperiel, Inc., San Francisco, CA (US)

( * ) Notice: Subject to any disclaimer, the term of this patent is extended or adjusted under 35 U.S.C. 154(b) by 320 days.

(21) Appl. No.: 17/608,606

(22) PCT Filed: May 1, 2020

(86) PCT No.: PCT/US2020/031063
§ 371 (c)(1),
(2) Date: Nov. 3, 2021

(87) PCT Pub. No.: WO2020/227109
PCT Pub. Date: Nov. 12, 2020

(65) Prior Publication Data
US 2022/0217137 A1    Jul. 7, 2022

Related U.S. Application Data

(60) Provisional application No. 62/843,797, filed on May 6, 2019.

(51) Int. Cl.
*H04L 9/40* (2022.01)
*G06N 20/00* (2019.01)

(52) U.S. Cl.
CPC ......... *H04L 63/0861* (2013.01); *G06N 20/00* (2019.01); *H04L 63/102* (2013.01); *H04L 63/107* (2013.01); *H04L 63/20* (2013.01)

(58) Field of Classification Search
CPC . H04L 63/0861; H04L 63/102; H04L 63/107; H04L 63/20; G06N 20/00; G06F 21/45; G06F 21/31
(Continued)

(56) References Cited

U.S. PATENT DOCUMENTS 8,813,179 B1 *  8/2014  Qureshi .................. H04L 63/20
                                                              726/1
9,032,321 B1     5/2015  Cohen et al.
(Continued)

OTHER PUBLICATIONS

X. Zhang et al., "Context-Aware Mobile Web Browsing Based on HTML5," 2012 9th International Conference on Ubiquitous Intelligence and Computing and 9th International Conference on Autonomic and Trusted Computing, Fukuoka, Japan, 2012, pp. 945-950, doi: 10.1109/UIC-ATC.2012 (Year: 2012).*
(Continued)

*Primary Examiner* — Jacob Lipman
(74) *Attorney, Agent, or Firm* — Sunstein LLP

(57) ABSTRACT

A method of interacting within a device-independent contextually driven application computing environment utilizing computer processes. The processes receive sensor data that is detected by a given client computing device. The sensor data pertains to a physical world interaction of the given client computing device. The processes process the sensor data and a user identification of a user to derive a current computing context that is both specific to the user and specific to a given location associated with the sensor data. The processes automatically communicate a current user interface configuration to a local browser process corresponding to the current computing context, so that the local browser process executing on the given client computing device automatically implements the current user interface configuration. The processes interacting with the
(Continued)

local browser process according to the current computing context by selecting and automatically loading a given one of a set of context modules.

37 Claims, 44 Drawing Sheets

(58) Field of Classification Search
USPC .......................................................... 726/4
See application file for complete search history.

(56) References Cited

U.S. PATENT DOCUMENTS

| | | | | |
|---|---|---|---|---|
| 2008/0275974 | A1* | 11/2008 | Rackiewicz | H04N 21/2743 |
| | | | | 709/223 |
| 2012/0115501 | A1* | 5/2012 | Zheng | H04W 4/185 |
| | | | | 455/456.1 |
| 2013/0159476 | A1* | 6/2013 | Hilburn | H04L 67/306 |
| | | | | 709/220 |
| 2013/0340086 | A1 | 12/2013 | Blom | |
| 2014/0189802 | A1 | 7/2014 | Montgomery | |
| 2016/0065626 | A1* | 3/2016 | Jain | H04L 65/403 |
| | | | | 709/205 |
| 2017/0317978 | A1* | 11/2017 | Diaz-Cuellar | H04L 63/0263 |
| 2023/0037835 | A1* | 2/2023 | Sharma | G06Q 30/0256 |

OTHER PUBLICATIONS

ISA/US, International Search Report and Written Opinion dated Jul. 24, 2020 for PCT application No. PCT/US2020/031063, 16 pages.

* cited by examiner

DEVICE-INDEPENDENT, CONTEXTUALLY DRIVEN APPLICATION COMPUTING ENVIRONMENT

PRIORITY

This application is the national phase entry under 35 U.S.C. § 371 of Patent Cooperation Treaty application no. PCT/US2020/031063, filed May 1, 2020, which claims the benefit of U.S. provisional patent application Ser. No. 62/843,797, filed May 6, 2019, each of which is hereby incorporated, in its entirety, by reference.

TECHNICAL FIELD

The present invention relates to the area of server-based software services, and more particularly to computer-implemented systems and methods for providing a device-independent contextually driven application computing environment.

BACKGROUND ART

It is known in the prior art that a user interacts with online services by installing and running applications on a mobile computing device. Prior art applications can only be installed and run on one mobile computer device. The installing and running of these applications is dependent on the operating system of the device. These applications must also be installed manually by the user of the computing device. Prior art applications are also expensive to build, as they require a team of specially trained programmers to develop.

SUMMARY OF THE EMBODIMENTS

In a first embodiment of the invention there is provided a server system that establishes a device-independent, contextually driven application computing environment. The server system includes a web portal that communicates with a set of client computing devices, including via a web port of a given client computing device running a local browser process. The server system also includes a user identification system that is coupled to a user database interface. The user identification system produces an identification of a given user based on data selected from the group consisting of user login data, user biometric data, user token data, and combinations thereof. The server system further includes a sensor data interface that receives sensor data from a sensor data uploader running on the given client computing device pertaining to a physical world interaction of the given client computing device. The server system also includes a context determiner that is coupled to the sensor data interface and to the user identification system and the user database interface. The context determiner processes the sensor data and the user identification, to derive a current computing context, for the local browser process, wherein the context is both specific to the given user and specific to a given location with respect to the portable computing device. The server system further includes a configuration interface that is coupled to the context determiner, which automatically communicates, to a configuration implementer executing in the local browser process, a current user interface configuration corresponding to the current computing context, so that the configuration implementer automatically implements the current user interface configuration. The server system also includes a context module loader that is coupled to the context determiner. The context module loader selects and automatically loads a selected one of a set of context modules to interact with the local browser process according to the current computing context.

Variations in this first embodiment are contemplated. In one variant, the server system is selected from the group consisting of a centralized server system coupled to the internet, a distributed edge-based server system, and combinations thereof. In another variant, the sensor data interface is configured to receive data from local browser processes executing on a plurality of operating systems configured on the set of client computing devices.

In a further variant, the server system further includes an enrollment system, coupled to the user identification system, sensor data interface, and the user database interface. The enrollment system receives user authentication data from the given client computing device. The authentication data is selected from the group consisting of user login data, user biometric data, user token data, and combinations thereof. The enrollment system generates a user identifier that is communicated to the given client computing device based on the authentication data. The enrollment system receives a user profile from the given client computing device. The user profile has user preferences with assigned authentication levels. The enrollment system store the user authentication data and user profile associated with the user identifier. In this variant, the user identification system receives login data and the user identifier from the given client computing device. The user identification system then verifies the login data against the stored user authentication data associated with the user identifier. The user identification system further establishes a session between the server and the given client computing device.

In another variant, the sensor data interface is configured to determine, from the received sensor data, a location identifier that is generated from a trigger signal indicative of the given location with respect to the given client computing device. In some embodiments, the trigger signal is selected from the group consisting of an iBeacon, a geofence, voice, audio recognition, visual recognition, hand gesture, facial expression, temperature, speed, pressure, biometrics, brain waves, barcode, simultaneous localization and mapping (SLAM) triggers, a HTTP post, Near Field Communication (NFC) smart poster interaction, a social media post, a location code, a codeword, a product logo, an advertisement, and combinations thereof. The server system further includes a location node interface coupled to the user database interface, the user context determiner, and the user ID system. The location node interface interacts with a location node associated with the location identifier based on the current computing context and a stored user profile. The location node interface updates the current computing context based on the interactions with the location node. In some embodiments, the user ID system determines the interactions with the location node based on current computing context. The user ID system next determines authentication levels assigned to the interactions in a stored user profile. The user ID system then verifies the authentication levels by prompting the user for authentication data. Alternatively or in addition, the context determiner uses machine learning to gather information from the interactions with the location node. The context determiner then updates user preferences in the user profile with the gathered information.

In a further variant, the context determiner is configured to determine whether location identifiers pertain to a location relevant to the user. The context determiner determines a set of location identifiers from the received sensor data that is generated from trigger signals indicative of a set of locations of the given client computing device. The context determines next determines whether each location identifier pertains to a location relevant for contextually driven interaction based on user preferences in a stored user profile. If a given one of the location identifiers is determined not to pertain to such a relevant location, then the content determiner prompts the user to indicate whether the given location identifier pertains to such a relevant location for contextually driven interaction. The content determiner updates the stored user profile with each location identifier determined to be pertain to a location relevant by the user.

In a second embodiment of the invention there is provided a method of interacting within a device-independent contextually driven application computing environment. The method utilizing computer processes, executed by a server system, the computer processes. The computer processes receive sensor data that is detected by a given client computing device. The sensor data pertaining to a physical world interaction of the given client computing device. The computer processes process the sensor data and a user identification of a user based on data selected from the group consisting of user login data, user biometric data, user token data, and combinations thereof, to derive a current computing context that is both specific to the user and specific to a given location associated with the sensor data. The computer processes automatically communicate a current user interface configuration to a local browser process corresponding to the current computing context, so that the local browser process executing on the given client computing device automatically implements the current user interface configuration. The computer processes interact with the local browser process according to the current computing context by selecting and automatically loading a given one of a set of context modules.

Variations in this second embodiment are contemplated. In one variant, the sensor data is received from local browser processes executing on a plurality of operating systems configured on the set of client computing devices. In another variant, the computer processes receive user authentication data from the given client computing device. The authentication data is selected from the group consisting of user login data, user biometric data, user token data, and combinations thereof. The computer processes next generate a user identifier that is communicated to the given client computing device. The computer processes then receive a user profile from the given client computing device, the user profile having user preferences with assigned authentication levels. The computer processes store the user authentication data and user profile associated with the user identifier.

In another variant, the computer processes receives login data and the user identifier from the given client computing device. The computer processes verifies the login data against the stored user authentication data associated with the user identifier. The computer processes then establishes a session between the server and the given client computing device.

In a further variant, the computer processes determine a location identifier from the received sensor data that is generated from a trigger signal indicative of the given location with respect to the given client computing device. In some embodiments, the trigger signal is selected from the group consisting of an iBeacon, a geofence, voice, audio recognition, visual recognition, hand gesture, facial expression, temperature, speed, pressure, biometrics, brain waves, barcode, SLAM triggers, a HTTP post, NFC smart poster interaction, a social media post, a location code, a codeword, a product logo, an advertisement, and combinations thereof. Alternatively or in addition, the computer processes interact with a location node associated with the location identifier based on the current computing context and a stored user profile. The computer processes then update the current computing context based on the interactions with the location node. Alternatively or in addition, the computer processes determines the interactions with the location node based on current computing context. The computer processes next determine authentication levels assigned to the interactions in a stored user profile. The computer processes then verify the authentication levels by prompting the user for authentication data.

In another variant, the computer processes use machine learning to gather information from the interactions with the location node. The computer processes then update user preferences in the user profile with the gathered information. In a further variant, the computer processes determine a set of location identifiers from the received sensor data that is generated from trigger signals indicative of a set of locations of the portable computing device. The computer processes next determine whether each location identifier pertains to a location relevant for contextually driven interaction based on user preferences in a stored user profile. If a given one of the location identifiers is determined not to pertain to such a relevant location, then the computer processes prompt the user to indicate whether the given location identifier pertains to such a relevant location for contextually driven interaction. The computer processes update the stored user profile with each location identifier determined to pertain to a location relevant by the user.

In a third embodiment of the invention there is provided a tangible non-transitory computer readable storage medium encoded with instructions that, when executed by a server system establishes computer processes for interacting within a device-independent contextually driven application computing environment. The method utilizing computer processes, executed by a server system, the computer processes. The computer processes receive sensor data that is detected by a given client computing device. The sensor data pertaining to a physical world interaction of the given client computing device. The computer processes process the sensor data and a user identification of a user based on data selected from the group consisting of user login data, user biometric data, user token data, and combinations thereof, to derive a current computing context that is both specific to the user and specific to a given location associated with the sensor data. The computer processes automatically communicate a current user interface configuration to a local browser process corresponding to the current computing context, so that the local browser process executing on the given client computing device automatically implements the current user interface configuration. The computer processes interact with the local browser process according to the current computing context by selecting and automatically loading a given one of a set of context modules.

Variations in this third embodiment are contemplated. In one variant, the sensor data is received from local browser processes executing on a plurality of operating systems configured on the set of client computing devices. In another variant, the computer processes receive user authentication data from the given client computing device. The authentication data is selected from the group consisting of user login data, user biometric data, user token data, and combinations thereof. The computer processes next generate a user identifier that is communicated to the given client computing device. The computer processes then receive a user profile from the given client computing device, the user profile having user preferences with assigned authentication levels. The computer processes store the user authentication data and user profile associated with the user identifier.

In another variant, the computer processes receive login data and the user identifier from the given client computing device. The computer processes next verify the login data against the stored user authentication data associated with the user identifier. The computer processes then establish a session between the server and the given client computing device.

In a further variant, the computer processes determine a location identifier from the received sensor data that is generated from a trigger signal indicative of the given location with respect to the given client computing device. Alternatively or in addition, the trigger signal are selected from the group consisting of an iBeacon, a geofence, voice, audio recognition, visual recognition, hand gesture, facial expression, temperature, speed, pressure, biometrics, brain waves, barcode, SLAM triggers, a HTTP post, a NFC smart poster interaction, a social media post, a location code, a codeword, a product logo, an advertisement, and combinations thereof. Alternatively or in addition, the computer processes interact with a location node associated with the location identifier based on the current computing context and a stored user profile. The computer processes update the current computing context based on the interactions with the location node. Alternatively or in addition, the computer processes determine the interactions with the location node based on current computing context. The computer processes next determine authentication levels assigned to the interactions in a stored user profile. The computer processes then verify the authentication levels by prompting the user for authentication data.

In another variant, the computer processes use machine learning to gather information from the interactions with the location node. The computer processes then update user preferences in the user profile with the gathered information. In a further variant, the computer processes determine a set of location identifiers from the received sensor data that is generated from trigger signals indicative of a set of locations of the portable computing device. The computer processes next determine whether each location identifier pertains to a location relevant for contextually driven interaction based on user preferences in a stored user profile. If a given one of the location identifiers is determined not to pertain to such a relevant location, then the computer processes prompt the user to indicate whether the given location identifier pertains to such a relevant location for contextually driven interaction. The computer processes update the stored user profile with each location identifier determined to pertain to a location relevant by the user.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
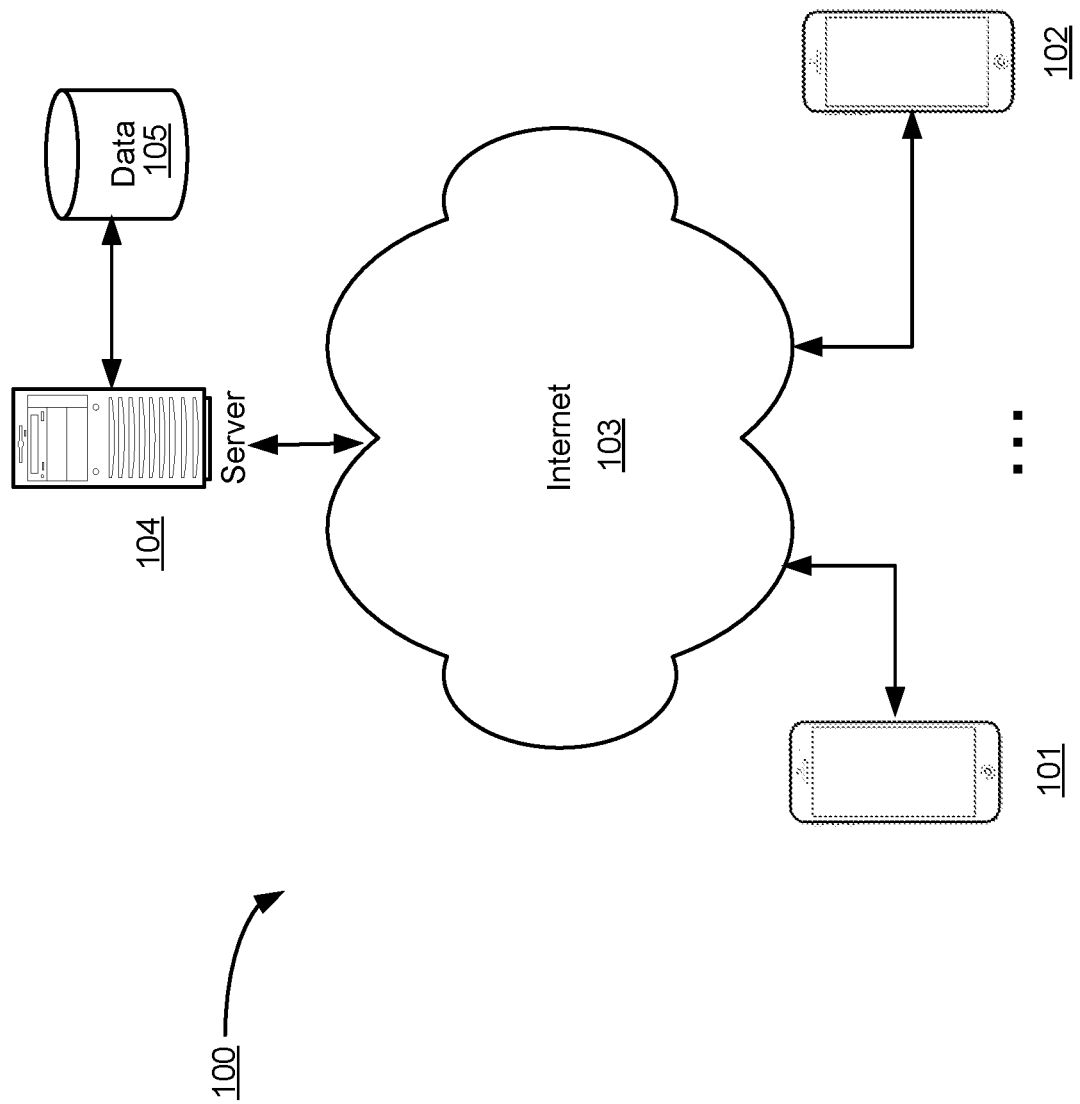
FIG. 1 is a diagram of high-level system architecture of an embodiment of the invention.

Definitions. As used in this description and the accompanying claims, the following terms shall have the meanings indicated, unless the context otherwise requires:

A "set" includes at least one member.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

"Sensor data" means data, derived by a portable computing device, on which a browser process is running, from the physical world external to the device, by means of a member selected from the group consisting of a global positioning system (GPS), an RF transceiver (such as a transceiver operating under IEEE standard 802.11x), Bluetooth, or other protocol, a near-field communication transceiver, a camera aimed at a pre-specified target (such as a bar code or QR code), a temperature sensor, an accelerometer, a barometer, an altimeter, a microphone, a heart rate sensor, a biometric sensor, and combinations thereof.

A "location" of a portable computing device means a current physical location of the device, which may include a position or a site, such as, but not limited to, a particular store, restaurant, home, museum, stadium, theatre, office, hotel, school, casino, park, ATM dispensary, or other facility in which the device is located; a physical action or object with respect to which a set of sensors of the device are interacting, wherein the physical action or object selected from the group consisting of a product, advertisement, magazine article, ticket, poster, another computing device, image, video, audio, and engagement in a particular activity; or a virtual action or object with respect to which the device is interacting, wherein the virtual action or object is selected from the group consisting of a website and an application accessible via the device, such as a social media website, a video game, and a digital marketplace.

A "current computing context" for a local browser process running on a local computing device is a context determined that is both specific to a given user and specific to a given location with respect to the portable computing device.

A "trigger signal" is a real-world physical trigger detected as indication of the "location" of the device, wherein the trigger is selected from the group consisting of an iBeacon, a geofence, voice, audio recognition, visual recognition, hand gesture, facial expression, temperature, speed, pressure, biometric, brain wave, barcode, SLAM trigger, an HTTP post, an NFC smart poster interaction, a social media post, a location code, a codeword, a product or service logo, an advertisement, and combinations thereof.

A "location node" means a device or application from which the trigger signal is generated, or a physical or virtual object from which the trigger signal is detected.

A "location identifier" means a series of one or more representative elements, which may include, such as, but not limited to, numbers, letter, and symbols, that identify the location.

A "client computing device" means any portable computing device including from the group consisting of a smartphone, a tablet, a laptop, augmented reality (AR) glasses, other wearable devices, Internet of Things (IoT) devices, cars, thermostats, refrigerators, other household appliances, and combinations thereof.

Embodiments of the invention are directed to systems and methods that establish a contextually driven application computing environment. The applications of this computing environment are device-independent, which means that the applications are built once and then work on all client computing devices regardless of the operating system. In embodiments, the applications are web pages implemented in a customized manner using JavaScript, Java Applets, and other such programming languages known in the art, and are launched at a web browser installed on the device based on the current computing context of the device. In other embodiments, the customized applications are embedded into other third-party applications, such as Adobe Acrobat Reader, Snapchat, Facebook, etc., installed on the client computing device, rather than as a standalone web browser or application. In these embodiments, the customized application launches as part of the third-party applications and transforms the third-party applications based on the current computing context of the device.

The applications can be cloud-based and edge-based, so the same application can be launched and run automatically on multiple client computing devices from cloud-based and edge-based servers. When applications are in cloud-based systems, the applications are multi-device apps that can span and coordinate across multiple devices, which allow all the multiple devices to function as one virtual device. As embodiments of the present invention are cloud-based systems, a difference from prior art applications is that the cloud-based applications of the present invention can span multiple devices and coordinate between the devices. In this way, these embodiments are like the conductor of an orchestra. Before the introduction of the present invention, a plurality of instruments gathered, each playing solo without regard to what the other instruments were playing. When applications are all in the cloud like these embodiments of the present invention, the applications can be better coordinated. That is, in the context of the orchestra, these embodiments take instruments that normally produce music on their own, and like a conductor, these embodiments advantageously enable the applications to play together to produce a symphony where the sum is greater than the parts. Traditionally, software is written for a specific device, rather than software living across the span of several devices.

Embodiments contextually launch applications according to the specific environment and stored preferences of the user. Embodiments dynamically reskin the web browser to the contextually launched application based on such user environment aspects as: the identity of the user associated with the client computing device running the web browser, where the user is location, the current time, the current date, and such. For example, two users entering the same location (e.g., stadium or restaurant) each receive contextually different applications automatically delivered to their client computer devices; such that the content delivered to each client computer device is specifically targeted to the corresponding user through the presentation of the particular application.

Embodiments provide screen editors (e.g., Pebbles and WYSWYG screen editor) so that contextually driven applications of the invention can be inexpensively build by anyone. This means that expensive multiple developer teams of programmers are not required for building these contextually driven applications. The applications in the cloud can be compiled or interpreted. The web browser can include a high-speed interpreter or can simply run the native code served from the cloud.

FIG. 1 is a diagram of high-level system architecture 100 of an embodiment of the invention. The system architecture includes a centralized server 104 coupled to the internet 103 and a database 105. The centralized server 104 establishes a device-independent, contextually driven application computing environment. The centralized server 104 communicates with client computing devices 101, 102 running local browser processes. The centralized server 104 derives current computing contexts for the local browser processes based on sensor data received from the respective client computing devices 101, 102. The sensor data may be received by the client computing devices 101, 102 as a trigger signal from a location node. The centralized server 104 automatically communicates current user interface configurations corresponding to the current computing contexts to the local browser processes, and interacts with the local browser processes based on the current computing contexts. The centralized server 104 also automatically interacts with the location node based on the current computing context.

Figure 2:
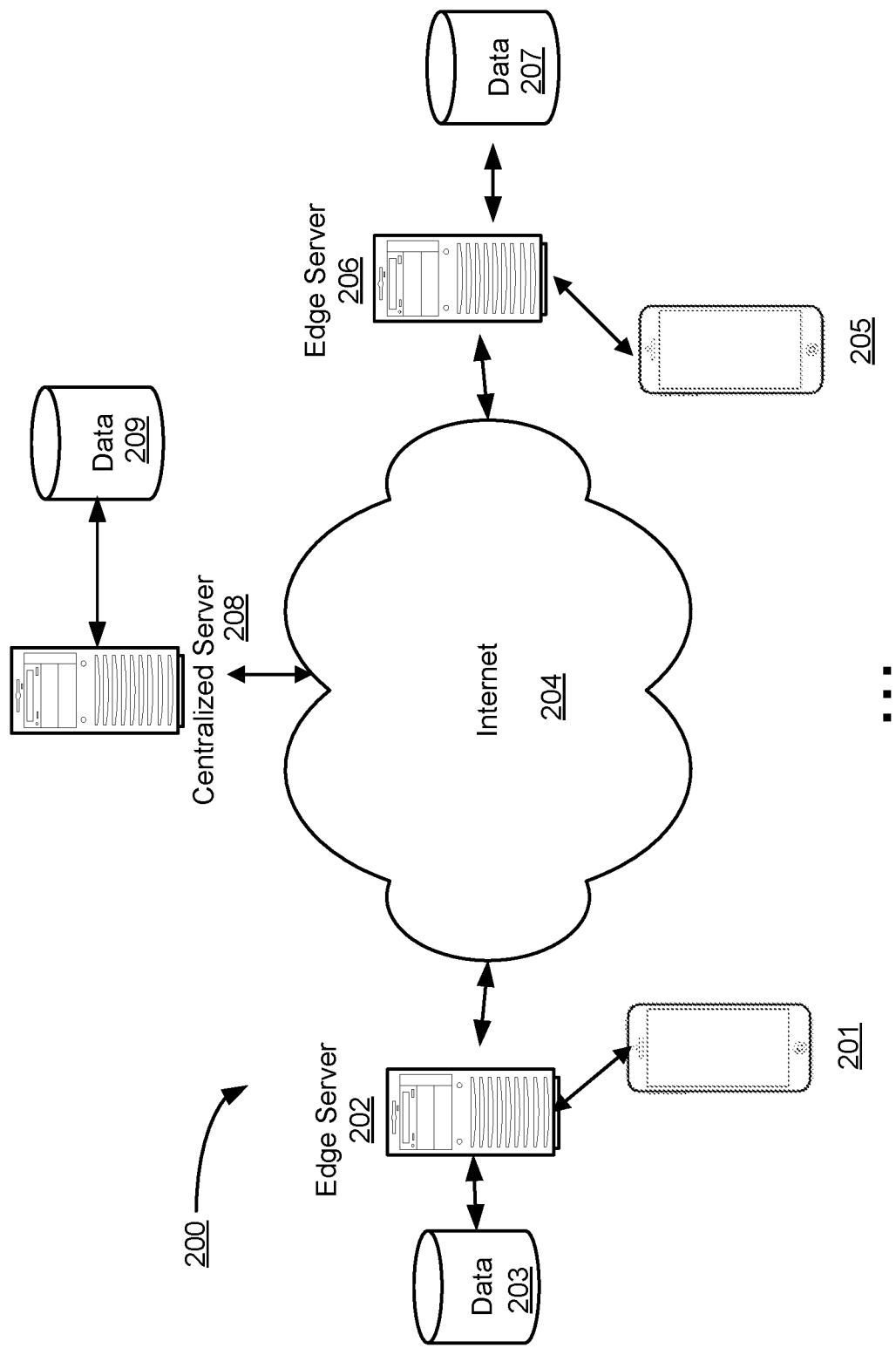
FIG. 2 is another diagram of high-level system architecture of an embodiment of the invention.

FIG. 2 is another diagram of high-level system architecture 200 of an embodiment of the invention. The system architectures of FIG. 1 and FIG. 2 can exist together in combined system architecture. The system architecture 200 of FIG. 2 includes a centralized server 208 coupled to the internet 204 and a database 209. The system architecture 200 also includes distributed edge-based servers 202, 206 coupled to corresponding client computing devices 201, 205 running local browser processes. The distributed edge-based servers 202, 206 are also coupled to respective databases 203, 207 and the internet 204. The distributed edge-based servers 202, 206 communicate with the centralized server 208 to store and process data.

A given distributed edge-based server 202 establishes a device-independent, contextually driven application computing environment with respect to a set of the client computing devices 201 running a set of local browser processes. The given distributed edge-based server 202 derives current computing contexts for the set of local browser processes based on sensor data received from the respective client computing devices 201. The sensor data may be received by the client computing devices 201 as a trigger signal of a given location node. The given distributed edge-based server 202 automatically communicates current user interface configurations corresponding to the current computing contexts and interacts with the set of local browser process based on the current computing contexts. The given distributed edge-based server 202 also automatically interacts with the given location node based on the current computing context.

In example embodiments, the distributed edge-based servers 202, 206 are location nodes. In some example embodiments, a given location node acts as a relay station, which transmits interactions to the centralized server communicative coupled to a set of location nodes. Alternatively or in addition, a given location node is fully provisioned with the functions of the centralized server and at the end of an interaction session sends data of the interaction session to the centralized server. In some example embodiments, the multiple distributed edge-based servers 202, 206 are configured as nodes in a peer-to-peer network and communication with each other to sync data of an interaction session.

Figure 3:
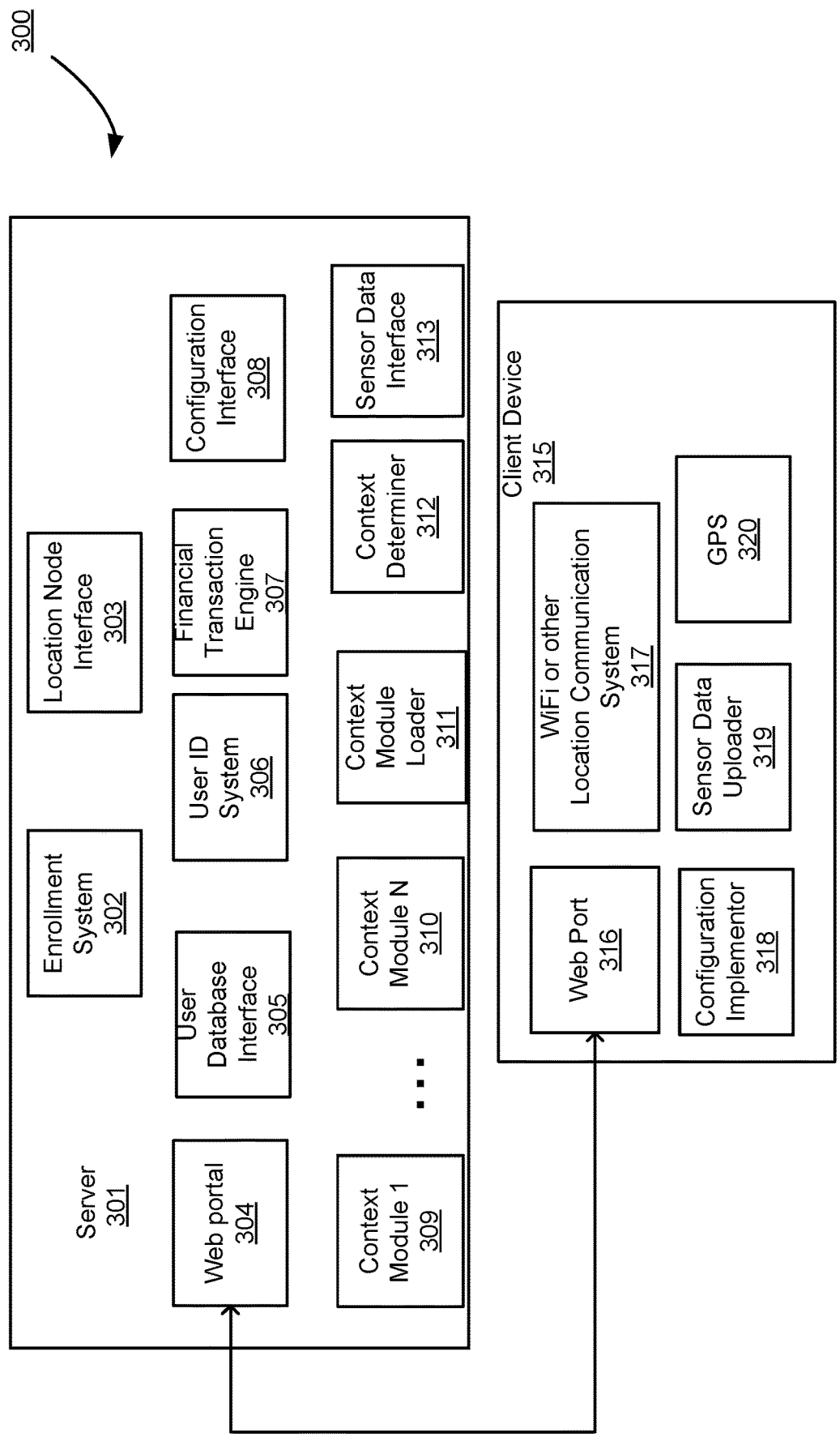
FIG. 3 is a more detailed diagram of the system architectures of FIG. 1 and FIG. 2.

FIG. 3 is a more detailed diagram of the system architectures 300 of FIG. 1 and FIG. 2. FIG. 3 illustrates example components of a server 301, such as the centralized server 104 of FIG. 1 and one of the distributed edge-based servers 202, 206 of FIG. 2. FIG. 3 also illustrates example components of a client computing device 315, such as one of the client computing device 101, 102, 201, 205 of FIG. 1 and FIG. 2.

The server 301 includes a web portal 304 that communicates with the client computing device 315 via a web port 316 running local browser processes. One way of implementing the functionality of the present invention is installing and using a conventional web browser at the web port 316 on the client computing device 315. The conventional web browser causes supplemental, customized browser processes to run in the web browser using JavaScript, Java Applets, or equivalent programming languages known in the art. Another way of implementing the functionality of the present invention is installing a custom web browser or application at the web port 316 that is configured specifically to run custom browser processes built by the server 301.

A further way of implementing the functionality of the present invention is installing one or more third-party applications at the web portal 316 on the client computing device 315. In this implementation, the customized browser processes are embedded into the third-party application, rather than run as a stand-alone web browser. For example, a third-party application, such as Adobe Acrobat Reader, Snapchat, Facebook, Candy Crush, etc., is configured on the client computing device 315 with the customized browser processes embedded in the third-party application.

The server 301 also includes a user database interface 305 for storing and accessing data of a user of the contextually driven application computing environment. The stored data includes authentication data and profile data for the user. The profile data has preferences of the user for permitting interactions within the application computing environment. For example, profile data of a user may have preferences for interacting with the applications of particular restaurants and stores. A given preference is associated with authentication levels that must be met to permit the interactions. The authentication levels may require verifying user identity based on user login data, user biometric data, user token data, and combinations thereof.

The server 301 further includes a user identification system 306, coupled to the user database interface 305, which produces an identification of a given user based on data selected from user login data, user biometric data, user token data, and combinations thereof. The server 301 also includes an enrollment system 302, coupled to the user identification system 306 and user database interface, that enrolls the user to the application computing environment, as described below in connection with FIG. 5. During enrollment, the enrollment system 302 communicates with the user identification system 306 to produce a user identifier (ID) based on authentication data provided by the user. The enrollment system 302 also communicates with the user database interface 305 to store the authentication data and profile data provided by the user.

The server 301 also includes a sensor data interface 313 that receives sensor data from a sensor data uploader 319 running on the client computing device 315 pertaining to a physical world interaction of the client computing device. The sensor data interface 313 determines a location ID from the received sensor data. The sensor data uploader 319 generates the sensor data by detecting a passive trigger signal indicative of the location of or presented by the client computing device 315. The detection of the passive trigger does not require the user to provide input or a particular behavior. The trigger signal may be an iBeacon, a geofence, voice, audio recognition (e.g., Shazam), vision recognition, hand gesture, facial expression, temperature, speed, pressure, biometrics, brain waves, barcode, SLAM triggers, a HTTP post, NFC smart poster interaction, a social media post, a location code, a codeword, a product or service logo, an advertisement and such, and combinations thereof. For example, the trigger signal may be an iBeacon from a restaurant in proximity of the client computing device. The sensor data uploader 319 may be coupled to a WiFi or other location communication system 317, GPS 320, and other components for detecting trigger signals. The sensor data uploader 319 may also allow the user to manually select triggers in which to interact, such as select to scan products, magazine articles, and barcodes. The sensor data uploader 319 may also be used to collect authentication data from the user, such a biometric data.

The server 301 also includes a context determiner 312 that is coupled to the sensor data interface 313 and to the user identification system 306 and the user database interface 305. The context determiner 312 processes the received sensor data and the user ID, to derive a current computing context for the local browser process that is both specific to the user and specific to the given location of and presented by the client computing device 315. The context determiner 312 may derive the current computing context using the location ID determined by the sensor data interface. In example embodiments, the context determiner 312 uses a machine learning algorithm to automatically derive the current computing context based on the user preferences data in the user profile and a determination of the user's current environment from the sensor data, such as the identity of the user, the location of the user, the current time, the current date, who the user is with, etc. Prior to deriving the current computing context, using the determined location ID, the context determiner 312 may determine whether a determined location identifier pertains to a location relevant for contextually driven interaction based on user preferences in a stored user profile accessed through the user database interface 305.

For example, using a location ID determined from received sensor data, the context determiner 312 may determine that a restaurant in proximity of the client computing device is relevant for contextually driven interaction based on the user preferences. The context determiner 312 may then derive an application for the restaurant based on the user ID and the location ID of the restaurant. The application is derived contextually in accordance with the user preferences in the stored profile data of the user.

The server 301 also includes a configuration interface 308, coupled to the context determiner 312, that automatically communicates, to a configuration implementer 318 executing in the local browser process, a current user interface configuration corresponding to the current computing context. The configuration implementer 318 automatically implements the current user interface configuration. The server 301 further includes a context module loader 311, coupled to the context determiner 312, which selects and automatically loads a selected one of a set of context modules 309 . . . 310 to interact with the local browser process according to the current computing context.

The server 301 further includes a location node interface 303, coupled to the user database interface 305, the user context determiner 312, and the user ID system 306. The location node interface 303 interactions with a location node associated with the location ID based on the current computing context and the stored user profile, as described below in connection with FIG. 8. In example embodiments, the location node interface 303 uses a machine learning algorithm to interact with the location node based on the user preferences data in the user profile and a determination of the user's current environment from the sensor data, such as the identity of the user, the location of the user, the current time, the current date, who the user is with, etc. The user data shared with the location node during the interactions with the location node is controlled by the onion skin security model of FIG. 4.

In example embodiments, the location node may be a local server situated at the location in proximity of the user and in communication with a centralized server, a centralized server in communication with a local device generating the trigger signal at the location, or combinations thereof. In some example embodiments, the location node is a distributed edge server, which alternatively or in addition, is configured as a node in a peer-to-peer network of location nodes that sync the interactions among each other. The server also includes a financial transaction engine 307 that computes financial transactions, such as payments, associated with the interactions with the location node.

Figure 4:
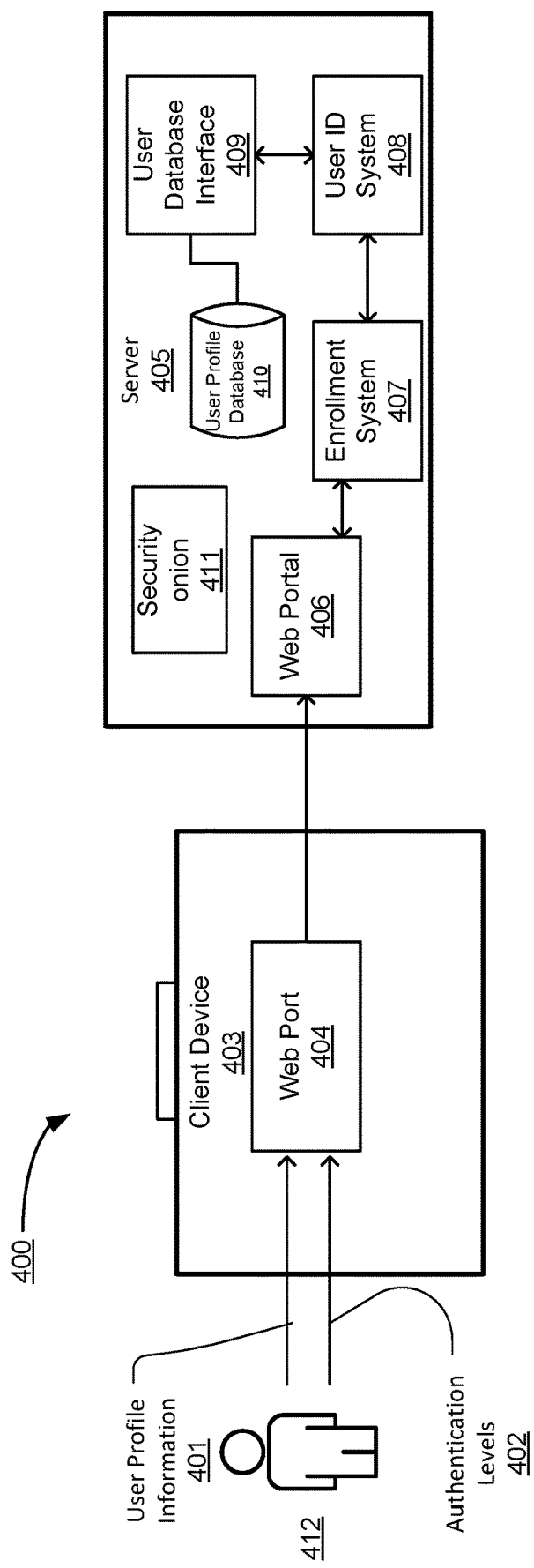
FIG. 4 is a schematic representation of data flow through functional components used in an embodiment of the invention to provide a security onion for authenticating a user.

FIG. 4 is a schematic representation 400 of data flow through functional components used in an embodiment of the invention to provide an onion skin privacy/security model 411 for authenticating a user. In FIG. 4, a user 412 provides user profile information 401 at the client computing device 403 via the web port 404 executing a client browser process during an enrollment process to the contextually driven application computing environment via the enrollment system 407. The user profile information 401 includes user preferences for interacting within the contextually driven application computing environment. Machine learning techniques also add user preferences to the user profile information 401 during interactions with location nodes.

The onion skin model (security onion) 411 provides user control over access to the user profile information 401. The access to the user profile information 401 corresponds to different authentication factors (e.g., factors 1-4) that are configured into different levels based on the factors. For example, a high level of authorization may require a 3-factor or 4-factor authentication, a mid-level of authentication may require a 2-factor authentication, and a low-level of authentication may require a 1-factor authentication (e.g., user login). In accordance with the onion skin model 411, the most sensitive data of the user profile information 401 is locked in the core of the onion, requiring a high level of authentication to access, whereas the least-sensitive data is protected in the outmost skin of the onion, requiring a low-level of authentication to access. The user 412 may assign an authentication level 402 to each user preference or parameter in the user profile information 401 in accordance with the onion skin model 411.

When a location node accesses a particular user preference or parameter of the user profile information 401, the user ID system 409 prompts the user for the authentication level (e.g., 1-factor, 2-factor, 3-factor, 4-factor, etc.) 402 assigned to that particular user preference or parameter. In the case of data access only requiring user login, the user ID system 409 may not prompt the user if the user is already logged into a session between the client computing device 403 and server 405. The user profile information 401 with the assigned authentication levels 402 is stored in the user profile database 410 accessible via the user database interface 409. In this way, when a user visits a certain location, such as a restaurant or hotel room, the server 405 can (based on permissions the user configured in the onion skin model) automatically interact with the user in the current context and securely impose the user preferences on the data shared with the surrounding user location nodes wherever the user travels.

Using the onion skin security model, rather than having to manually give numerous different location nodes access to the user data and having to re-enter the data every time the user interactions with the location nodes, the data is centralized in the user profile database 410. The user ID system 409 can then give each location node permission to access certain data at the corresponding assigned authentication levels, if relevant to help better serve the user, and the location node only accesses that certain data. The user can also make custom configurations to location nodes accessing the data. For example, if a user despises a certain restaurant chain, the user can manually change the user preferences data so that restaurant chain is on a black list or can only assess a partial view of a level of data. Such changes may also be made automatically by a machine learning process executing at the server 405.

Figure 5:
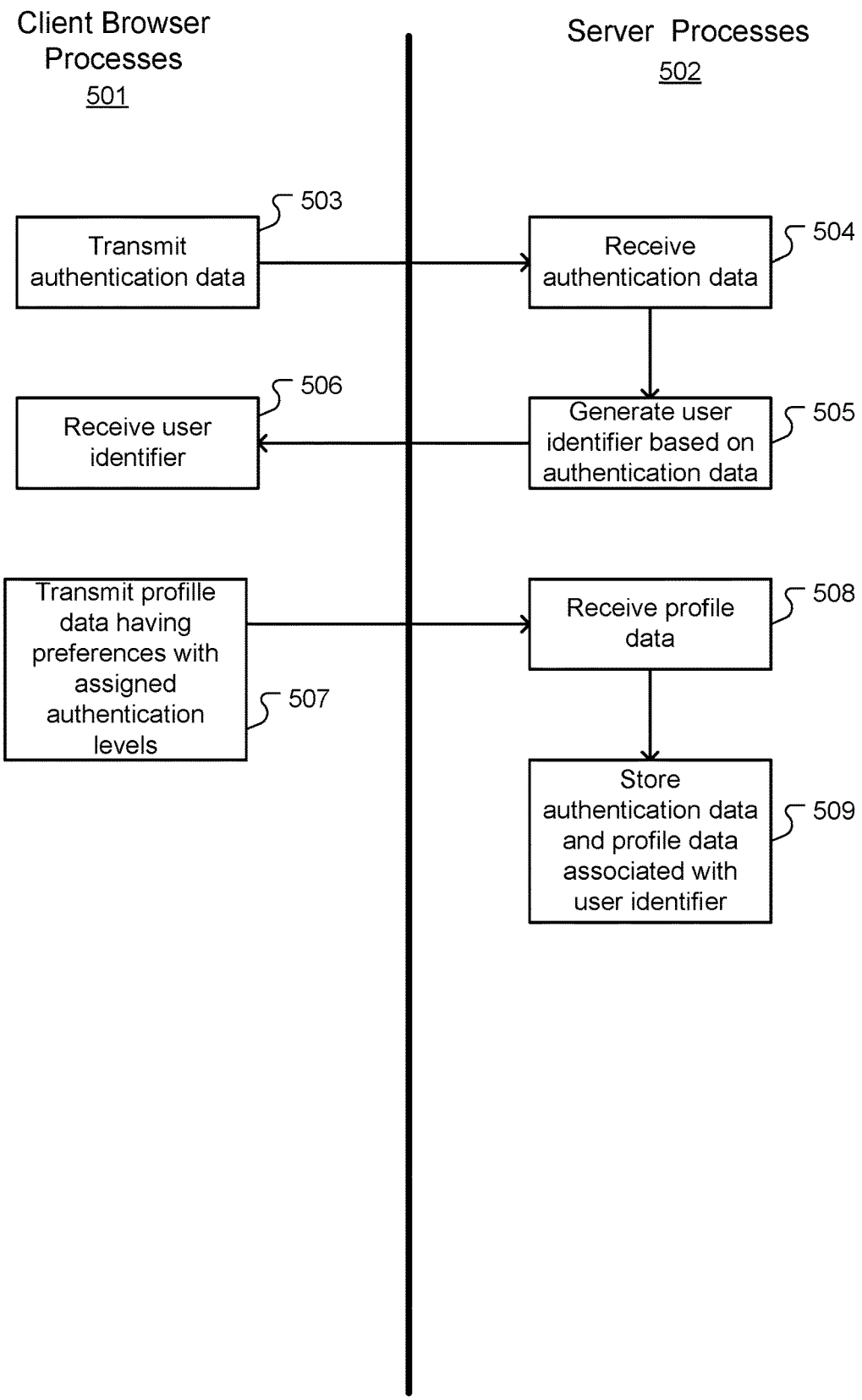
FIG. 5 is a flowchart illustrating logical flow for a method of enrolling a user in an embodiment of the invention.

FIG. 5 is a flowchart illustrating logical flow for a method of enrolling a user in an embodiment of the invention. The server processes 502 of FIG. 5 are contemplated to be carried out by an enrollment system, such as the enrollment system 302 of the server 301 shown in FIG. 3. In FIG. 5, the client browser processes 501 of a client computing device transmit 503 authentication data from a user. The authentication data may be associated with different authentication levels. The authentication data may include user login data, user biometric data, user token data, and combinations thereof. In the case of biometric data, the data may be collected using sensors (sensor data uploaders) configured in the client computing device.

The server processes 502 receive 504 the authentication data, and generates 505 a user identifier (ID) based on the authentication data. The client browser processes 501 receive 506 the user ID from the server processes 502. The user of the client computing device executing the client processes 501 may store the user ID for future access to the server processes 502. The client browser processes 501 then transmit 507 profile data having preferences with associated authentication levels (e.g., authentication factors) for the user. The server processes 502 receive 508 the profile data. The server processes 502 store 509 the profile data and authentication data associated with the user ID.

Figure 6:
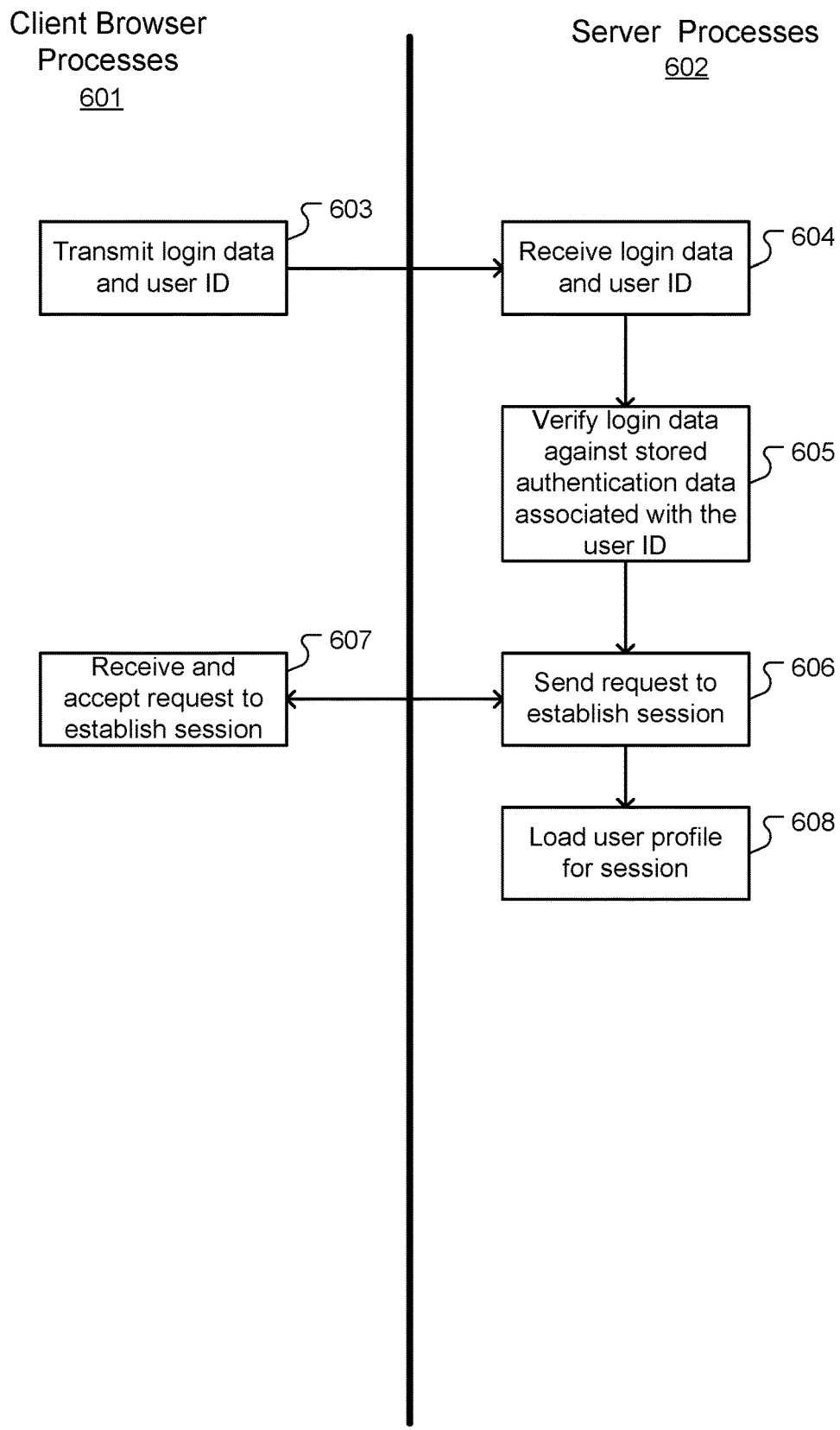
FIG. 6 is a flowchart illustrating logical flow for a method of establishing a session with a user in an embodiment of the invention.

FIG. 6 is a flowchart illustrating logical flow for a method of establishing a session within a contextually driven application computing environment in an embodiment of the invention. In FIG. 6, the user has previously enrolled in accordance with the enrollment method of FIG. 5.

The server processes 602 of FIG. 6 are contemplated to be carried out by a user identification system 306, such as the user identification system of the server shown in FIG. 3. In FIG. 6, the client browser processes 601 of a client computing device transmit 603 login data and a user ID, such as the user ID generated during the enrollment process of FIG. 5. The server processes 602 receive 604 the login data and user ID. The server processes 602 then verify 605 the login data against stored authentication data associated with the user ID. In response to successfully verifying the login data, the server processes 602 send 606 a request to the client browser processes 601 to establish a session or connection between the server and client computing device. The client browser processes 601 receive and accept 607 the request to establish the session. The server processes 602 load 608 the stored user profile for use in the session.

Figure 7:
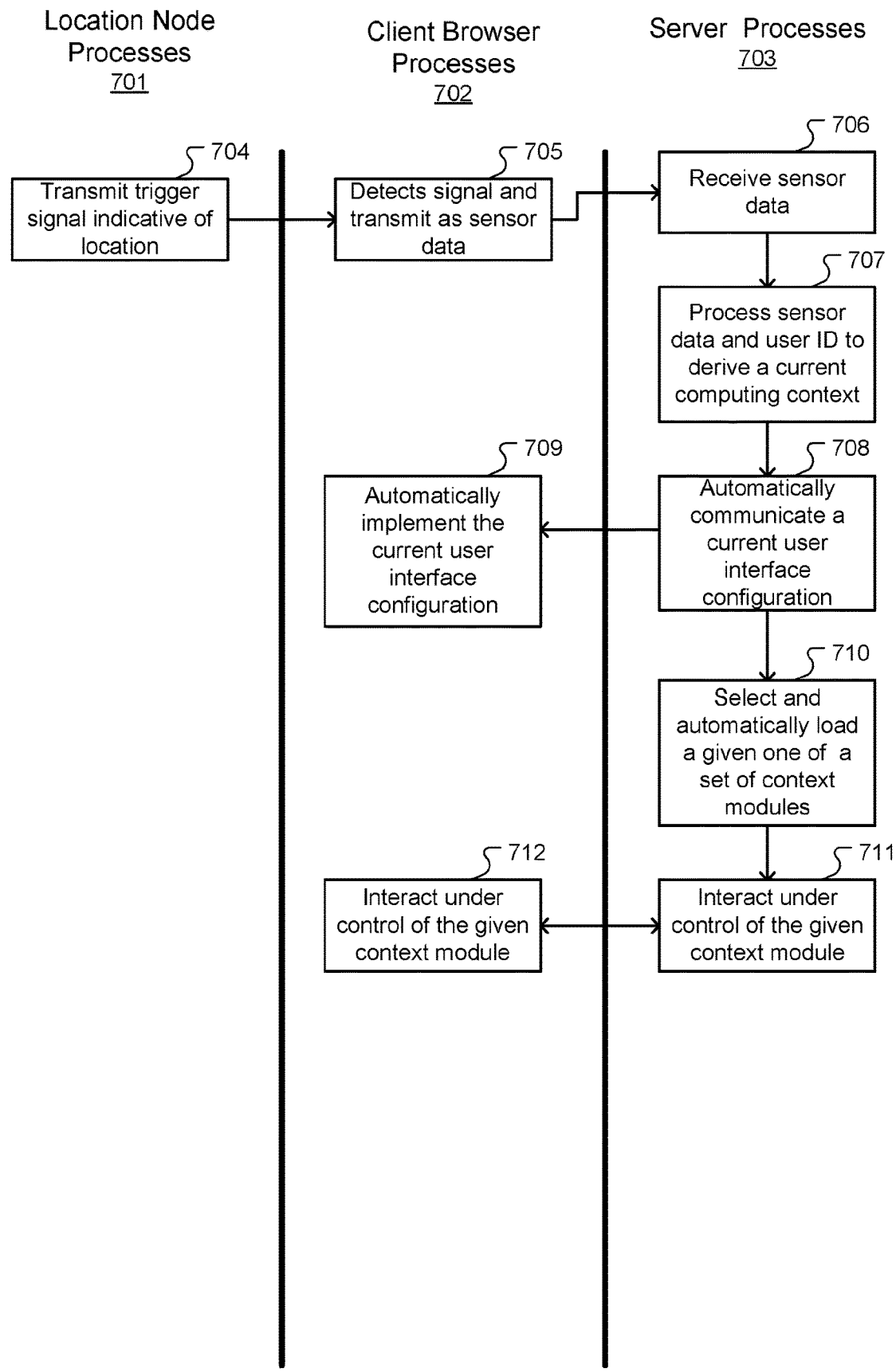
FIG. 7 is a flow chart illustrating a logical flow for a method of determining and configuring a current computing context for a client device in an embodiment of the invention.

FIG. 7 is a flow chart illustrating a logical flow for a method of determining and configuring a current computing context for a client computing device in an embodiment of the invention. In FIG. 7, the client computing device has previously established a session with the server in accordance with the method of FIG. 6.

The location node processes 701 of FIG. 7 transmit 704 a trigger signal indicative of a location that is in proximity of or presentable by the client computing device. For example, the transmitted trigger signal may be a geofence of a hotel in proximity of the client computing device. The client browser processes 702 detect and transmit 705 the signal as sensor data. The server processes 703 receive 706 the sensor data. The server processes 703 may determine a location ID for the given location associated with the sensor data.

The server processes 707 then process 707 the sensor data and user ID to derive a current computing context that is both specific to the user and specific to the given location associated with the sensor data. In example embodiments, the current computing context is an application (e.g., web page) implemented in a customized manner on a conventional web browser using JavaScript, Java Applets, and other such programming languages known in the art to be specific to the user and specific to the given location associated with the sensor data. The application may instead be implemented as a custom application on a web browser specifically configured to run the application, which is built by the server processes 707 in a customized manner according to the current computing context. The application may also be implemented as part of a third-party application (e.g., Acrobat Adobe Reader), such that processes are embedded in the third-party application and transform the third-party application to run based on the current computing context.

In some embodiments, a machine learning algorithm is used by the server processes 702 to derive the current computing context based on the preferences in the user profile and a determination of the user's current environment from the sensor data, such as the identity of the user, the location of the user, the current time, the current date, who the user is with, etc. Prior to deriving the current computing context, the server processes 703 may first verify that the given location in the sensor data pertains to a location relevant for contextually driven interaction based on user preferences in the user profile provided by the user during enrollment.

For example, the server processes 703 may derive an application for a restaurant in proximity of the user based on the preferences in the stored user profile. The server processes 703 may determine which stored user profile to use by determining who the user is from the user ID specified for the session between the client computing device and server. By further determining where the user is located and who is accompanying the user from the sensor data, and the current time, the server processes 703 may derive the restaurant application to present a dinner menu with sharable entrees offered at the restaurant. If the restaurant is not a typical destination by the user based on the user preferences, the server processes 703 may first prompt the user to verify that the restaurant is relevant for such contextually driven interaction prior to deriving the restaurant application.

The server processes 703 next automatically communicate 708 a current user interface configuration corresponding to the current computing context. The client browser processes 702 receive and automatically implement 709 the current user interface configuration. The server processes 703 select and automatically load 710 one of a set of context modules. The server processes 703 and client processes 702 interact 711, 712 under control of the given context module in accordance with the current computing context. In some embodiments, the server processes 703 do not implement a graphical user interface configuration and a context module, as the interactions based on the current computing environment do not require input from the user. For example, in response to a trigger signal from the Weather Channel, the server processes 703 may interact with a location node of a home automation system to automatically turn off a home sprinkler system without input from the user.

In example embodiments, the current user interface is a user interface of an application (e.g., web page) implemented in a customized manner on a conventional web browser, using JavaScript, Java Applets, or other such programming languages known in the art, on a custom web browser or application implemented by the server processes 703, embedded in a third-party application (e.g., Snapchat or Facebook), or such, according to the current computing context. The web browser or third-party application causes the client browser processes 702 to automatically communicate and run this application (e.g., as a web page or other application) in the web browser or third-party application by the client browser processes 702. The server processes 703 interact with this application under control of the given context module.

For example, a third-party application, such as Adobe Acrobat Reader, Snapchat, Facebook, Candy Crush, etc., is installed on the client computing device and running the embedded client browser processes 702. The third-party application, via the client browser processes 702, implements the current user interface configuration corresponding to the current computing context within the third-party application. For example, if the user walks into a stadium, restaurant, theme park, etc., the third-party application (e.g., Adobe Acrobat), via the client browser processes 702, transforms (reskins) itself and becomes the application of the stadium, restaurant, theme park, etc. In this way, the web browser or application of the present invention may be configured across a network of third-party applications, and each of the third-party applications can be transformed by the embedded web browser or application to the current computing context.

In these example embodiments, the server processes 703 may be configured as a universal application that pushes (e.g., via push notifications) or publishes the application (and all other applications of the user) to the client browser processes 702 for running the application. The universal application may also kill applications running by the client browser processes 702. The universal application may be configured as an app store. The server processes 703 may record the applications launched at the client computing device and other client computing devices associated with the user in order to bill payment to the user for running the application or bill payment for a subscription to the app store. The server processes 703 may also prompt the user for approval to launch certain applications for additional payment.

For example, if the server processes 703 determine that a user is at a Taylor Swift concert, the server processes 703 may send a prompt to the user via the client browser processes 702 and ask the user if the user wants to pay an extra $2 to launch the Taylor Swift Concert Experience app to tap into some extra fun. For another example, if the server processes 703 determine that a user is at a museum, and rather than having to rent an audio guide in the old, clunky way, the server processes 703 may send a prompt to the user via the client browser processes 702 and asks if the user wants to run an audio guide app to the museum for $1. For another example, if the server processes 703 determine that a user is at a train station, instead of the user having to go to the ticket booth or the ticket machine, the server processes 703 automatically load a ticket purchase app that allows the user to buy a ticket.

The use of the user preferences in the user profile by the server processes 703 is not limited to deriving and implementing the right computing context (e.g., apps) at the right time or imposing data access limitations and settings on the surrounding location nodes. The user preferences also allow the server processes 703 to populate apps with the right data based on context. So for instance, in the train station example above, the server processes 703 do not just load the ticket purchase app, but also pre-populates the ticket purchase app with the correct data based on the server processes 703 determining where the user likely wants to travel from the user preferences. The server processes 703 then already have the right ticket selected for the user to purchases, rather than the user having to search for the ticket.

Figure 8:
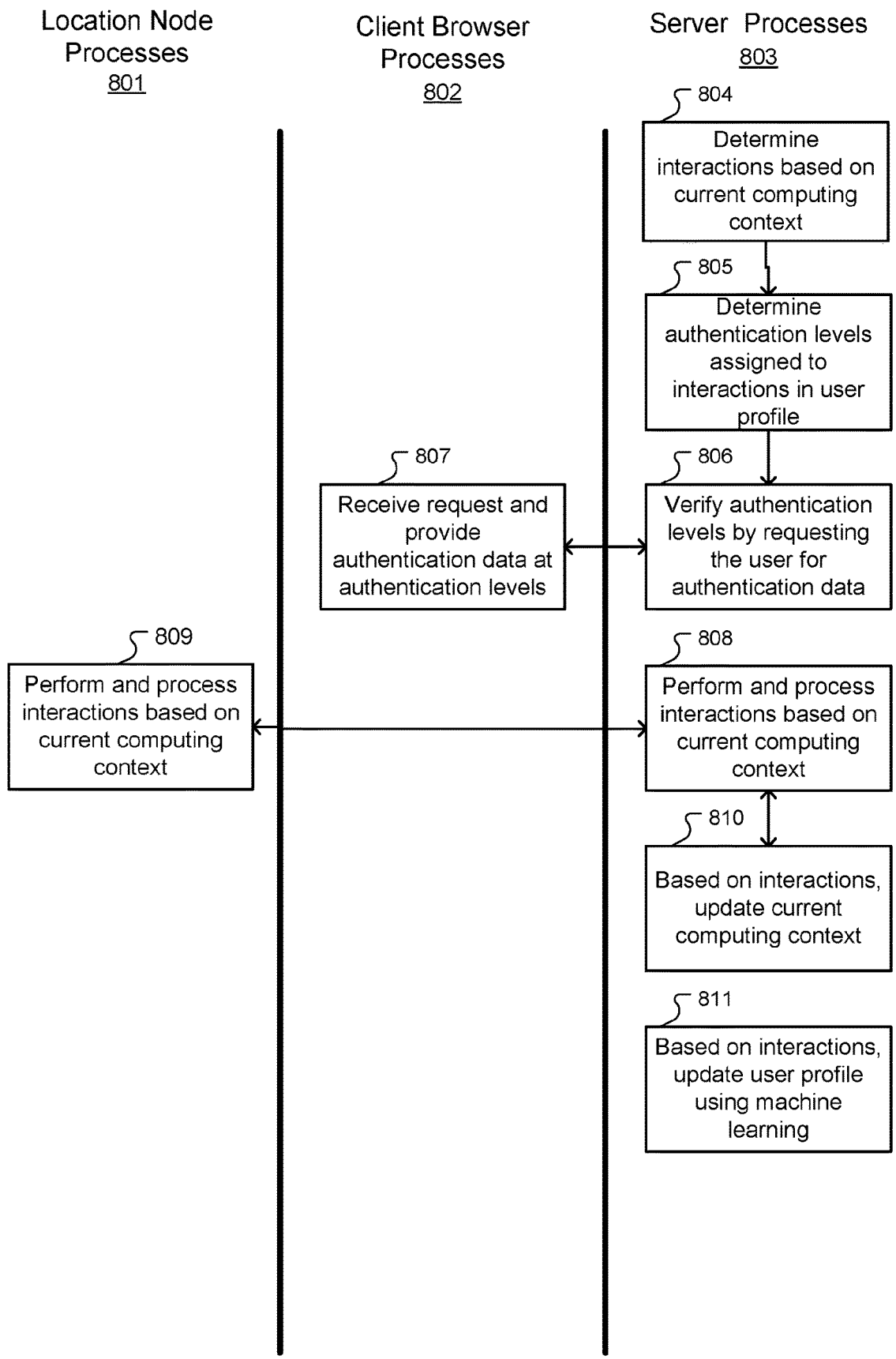
FIG. 8 is a flow chart illustrating logical flow for a method of interacting with a location node based on a current computing context in an embodiment of the invention.

FIG. 8 is a flow chart illustrating logical flow for a method of interacting with a location node based on a current computing context in an embodiment of the invention. In FIG. 8, the client computing device has previously configured a current computing context for a client computing device in accordance with the method of FIG. 7.

In FIG. 8, the server processes 803 determine 804 interactions based on the current computing context. For example, the current computing context may be a particular coffee shop application derived based on the preferences in the user profile for the current time of 8 am. The server processes 803 may determine coffee shop interactions, such as automatically ordering the user an expresso, based on the current computing context. The server processes 803 then determine 805 the authentication levels assigned to the interactions by the preferences in the user profile (according to the onion skin security model of FIG. 4). The server processes 803 verify 806 the authentication levels by requesting the user for authentication data. The client browser processes 802 receive the request and provide 807 authentication data from the user in accordance with the authentication levels. For example, the interactions of ordering the user an expresso may be assigned authentication levels that require 2-factors of login data and a token. As the user is already logged in, the server processes 803 request only the token via the client browser processes 802 and verify the token returned by the user against the token in the stored authentication data provided by the user during enrollment.

Once the server processes 803 verifies the authentication levels, the server processes 803 and location node processes 801 perform and process 808, 809 interactions based on the current computing context. Based on the interactions, the server processes 803 update 810 the current computing context. In some embodiments, a machine learning algorithm is used by the server processes 802 to perform and process the interactions. The machine learning algorithm processes the interactions based on the user profile and a determination of the user's current environment from the sensor data, such as the identity of the user, the location of the user, the current time, the current date, who the user is with, etc. For example, by determining that the user is at a restaurant alone and at the end of the meal, the server processes 802 may update the application (current computing context) to present a payment user interface on the web browser of the client computing device. For another example, by determining that the user is at the restaurant with a friend and at the end of the meal, the server processes 802 may update the application (current computing context) of each the user and friend to present a payment user interface on the web browsers of each of their client computing devices that allows splitting the bill.

Based on the interactions, the server processes 803 may also automatically update 811 the preferences in the user profile using machine learning techniques. For example, if at the coffee shop, the user also orders a croissant for the third time that same week, the server processes 803 may update the user preferences in the user profile accordingly to automatically order a croissant with the expression if the user is in proximity of the coffee shop at 8 am.

Figure 9:
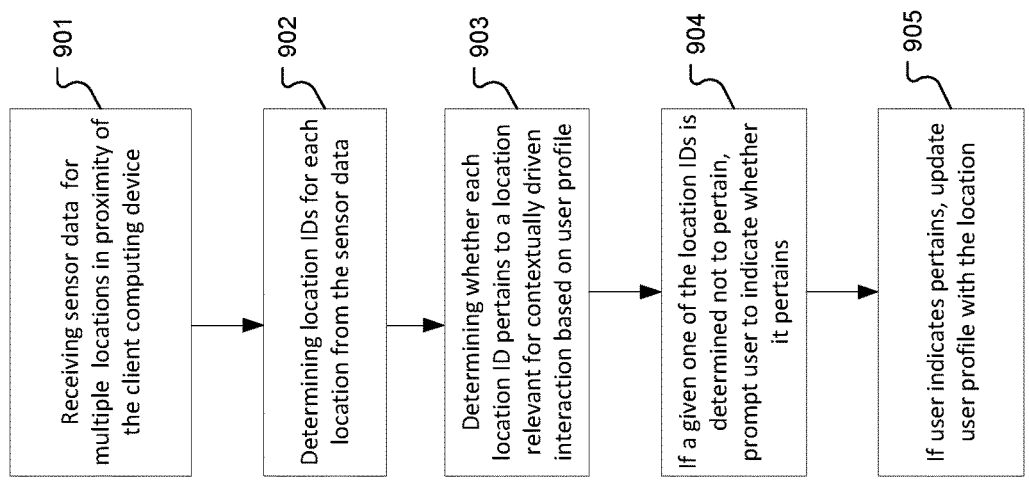
FIG. 9 is a flow chart illustrating a logical flow for method of determining and updating relevant location nodes for user interaction in an embodiment of the invention.

FIG. 9 is a flow chart illustrating a logical flow for method of determining and updating relevant location nodes for user interaction in an embodiment of the invention. In FIG. 9, a first process 901 receives sensor data for multiple locations in proximity of the client computing device. For example, the user may be in Times Square in NYC where 1000 different locations have geofences or other triggers. A second process 902 determines location IDs for each location from the sensor data. A third process 903 determines whether each location ID pertains to a location relevant for contextually driven interaction based on preferences in the user profile. If a set of the location IDs is determined not to pertain to a relevant location, then a fourth process 904 prompts the user to indicate whether one or more of the location IDs of the set are relevant for contextually driven interaction. The fourth process 904 may use machine learning techniques based on the user preferences to determine a subset of the locations most likely to be relevant for contextually driven interaction, and prompt the user for indication with respect to just the determined subset of locations. The fourth process 904 may present the location IDs to the user ranked in order of relevancy based on analysis of the user profile. If the user indicates that the location ID pertains to a relevant location, a fifth process 905 updates user preferences in the user profile with the location and derives a current computing context based on the location.

Figure 10:
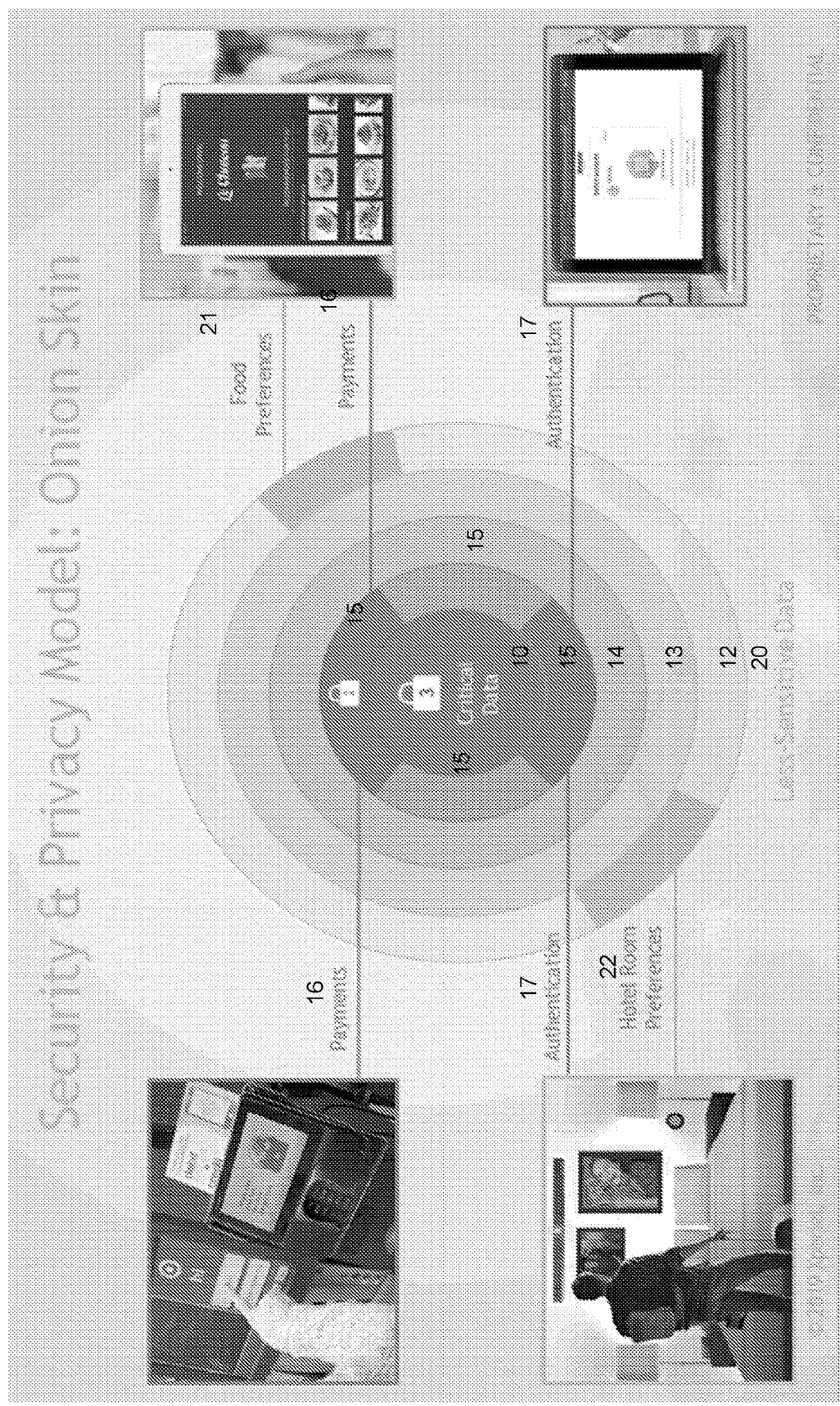
FIG. 10 is a diagram of a security and privacy model used in embodiments of the invention.

FIG. 10 is a diagram of a security and privacy model used in embodiments of the invention. FIG. 10 illustrates an example of the onion skin privacy and security model described in FIG. 4. FIG. 10 illustrates in the onion skin model that the most critical/sensitive data 10 of the user profile is protected in the core of the onion, requiring multi-multi-factor authentication (e.g., factor-3 or factor-4) to access. Highly-sensitive data 15 of the user profile (e.g., payment information 16) is protected in the skin near the core of the onion, requiring dual-factor (e.g., factor-3 or factor-2) 17 authentications to access. Moderately-sensitive data 12, 13, 14 of the user profile is protected in the middle skins of the onion, requiring multi-factor authentication (e.g., factor-2 or factor-3) to access. Less-sensitive data 20 of the user profile (e.g., food preferences 21 and hotel room preferences 22) is protected in the outermost skin of the onion, requiring only data login authentication.

Figure 11:
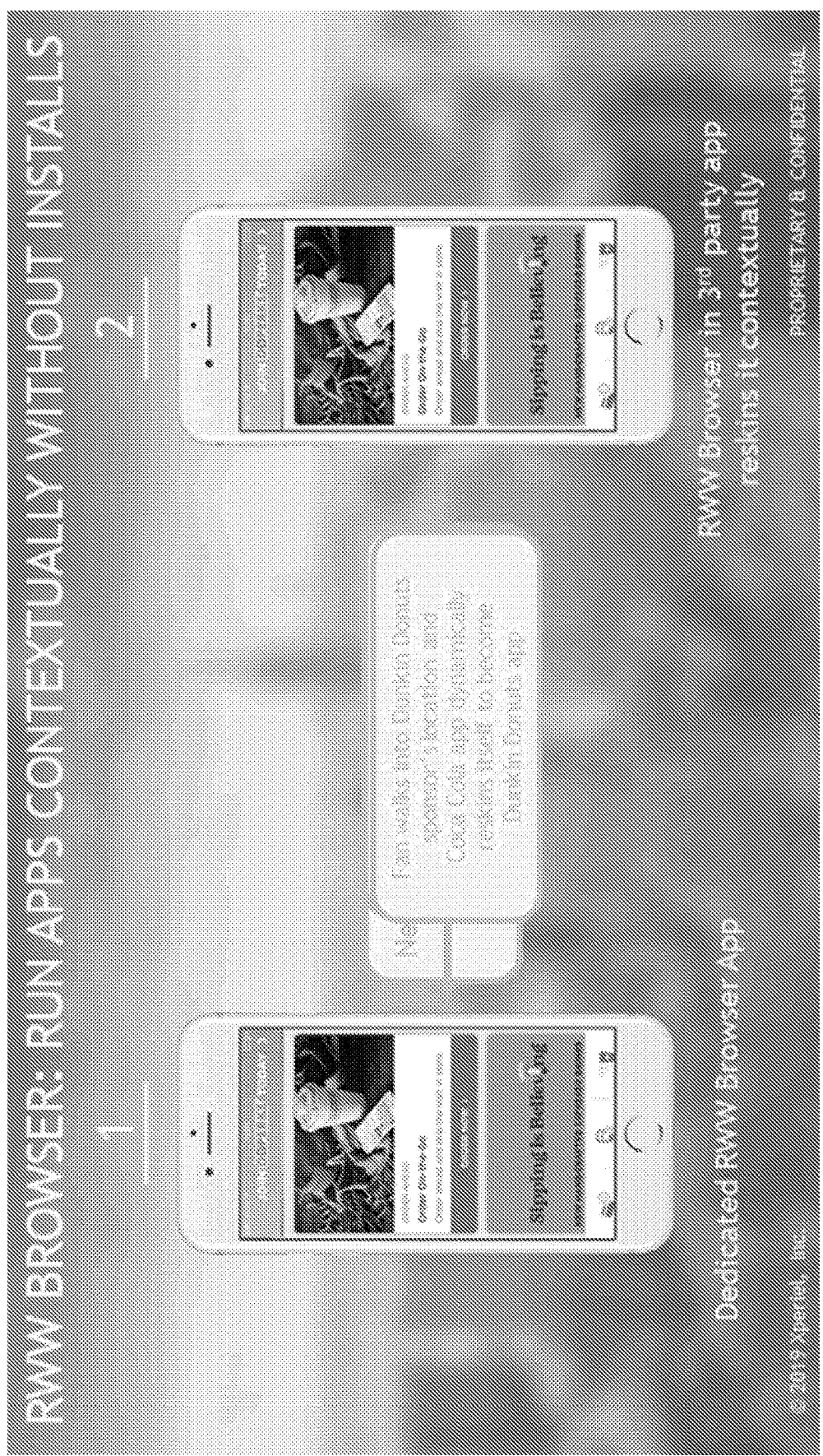
FIG. 11 is a diagram including a representation of mobile user interfaces, in accordance with an embodiment of the invention, presenting a contextually driven third-party application in a browser without requiring installation of the third-party application.

FIG. 11 is a diagram including a representation of mobile user interfaces, in accordance with an embodiment of the invention, automatically presenting a contextually driven third-party application in a browser without requiring installation of the third-party application. In embodiments, the mobile user interfaces may include menus or other options to present the contextually driven third-party application. Server processes implement and interact with the contextually driven third-party restaurant application in the browser in accordance with FIG. 7.

Figure 12:
FIG. 12 is a diagram including a representation of a mobile user interface, in accordance with an embodiment of the invention, presenting a contextually driven restaurant application in response to an iBeacon trigger.

FIG. 12 is a diagram including a representation of a mobile user interface, in accordance with an embodiment of the invention, presenting a contextually driven restaurant application in response to an iBeacon trigger. Server processes implement and interact with the contextually driven third-party restaurant application in response to detecting the iBeacon trigger in accordance with FIG. 7.

Figure 13:
FIG. 13 is a diagram including a representation of a mobile user interface, in accordance with an embodiment of the invention, reporting interactions of the contextually driven restaurant application of FIG. 12 based on user preferences.

FIG. 13 is a diagram including a representation of a mobile user interface, in accordance with an embodiment of the invention, reporting interactions of the contextually driven restaurant application of FIG. 12 based on user preferences. Server processes interact with the restaurant location node and the contextually driven restaurant application in accordance with FIGS. 7 and 8.

Figure 14:
FIG. 14 is a diagram including a representation of a mobile user interface, in accordance with an embodiment of the invention, presenting automatic ordering interactions with a contextually driven restaurant application.

FIG. 14 is a diagram including a representation of a mobile user interface, in accordance with an embodiment of the invention, presenting automatic ordering interactions with a contextually driven restaurant application. In various embodiments, such interactions may require confirmation from the user. Server processes perform ordering interactions with the restaurant location node and the contextually driven restaurant application in accordance with FIGS. 7 and 8.

Figure 15:
FIG. 15 is a diagram including a representation of a mobile user interface, in accordance with an embodiment of the invention, presenting automatic payment interactions with a contextually driven application.

FIG. 15 is a diagram including a representation of a mobile user interface, in accordance with an embodiment of the invention, presenting automatic payment interactions with a contextually driven application. Server processes perform automatic payment interactions with the payment location node and the contextually driven application in accordance with FIGS. 7 and 8.

Figure 16:
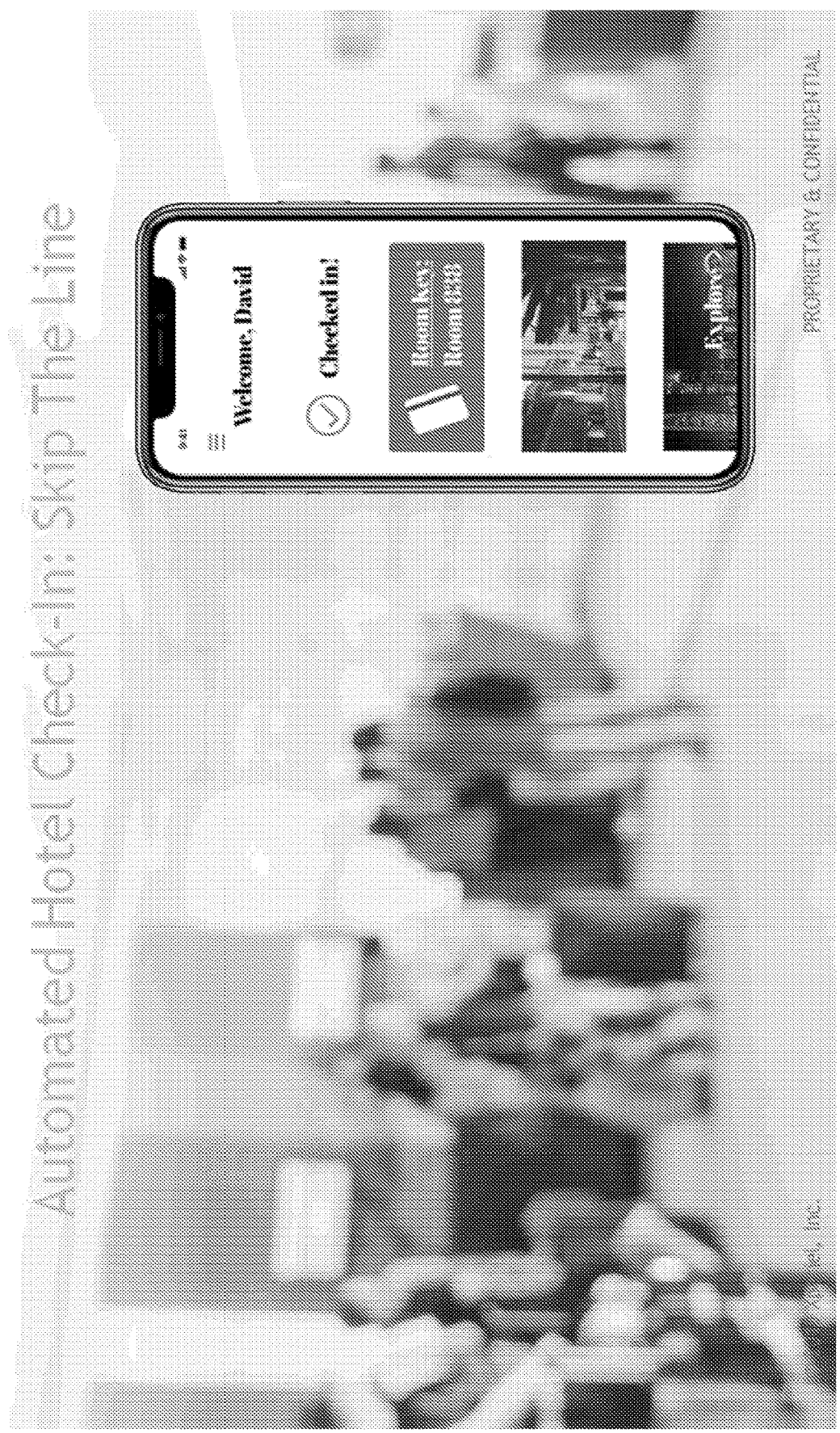
FIG. 16 is a diagram including a representation of a mobile user interface, in accordance with an embodiment of the invention, presenting automatic check-in interactions with a contextually driven hotel application.

FIG. 16 is a diagram including a representation of a mobile user interface, in accordance with an embodiment of the invention, presenting automatic check-in interactions with a contextually driven hotel application. Server processes perform automatic check-in interactions with the hotel location node and the contextually driven hotel application in accordance with FIGS. 7 and 8.

Figure 17:
FIG. 17 is a diagram including a representation of a mobile user interface, in accordance with an embodiment of the invention, presenting automatic door unlocking interactions with a contextually driven hotel application.

FIG. 17 is a diagram including a representation of a mobile user interface, in accordance with an embodiment of the invention, presenting automatic door unlocking interactions with a contextually driven hotel application. Server processes perform automatic door unlocking interactions with the hotel location node and the contextually driven hotel application in accordance with FIGS. 7 and 8.

Figure 18:
FIG. 18 is a diagram including a representation of a mobile user interface, in accordance with an embodiment of the invention, presenting automatic room configuration interactions with a contextually driven hotel application.

FIG. 18 is a diagram including a representation of a mobile user interface, in accordance with an embodiment of the invention, presenting automatic room configuration interactions with a contextually driven hotel application. Server processes perform automatic room configuration interactions with the hotel location node and the contextually driven hotel application in accordance with FIGS. 7 and 8.

Figure 19:
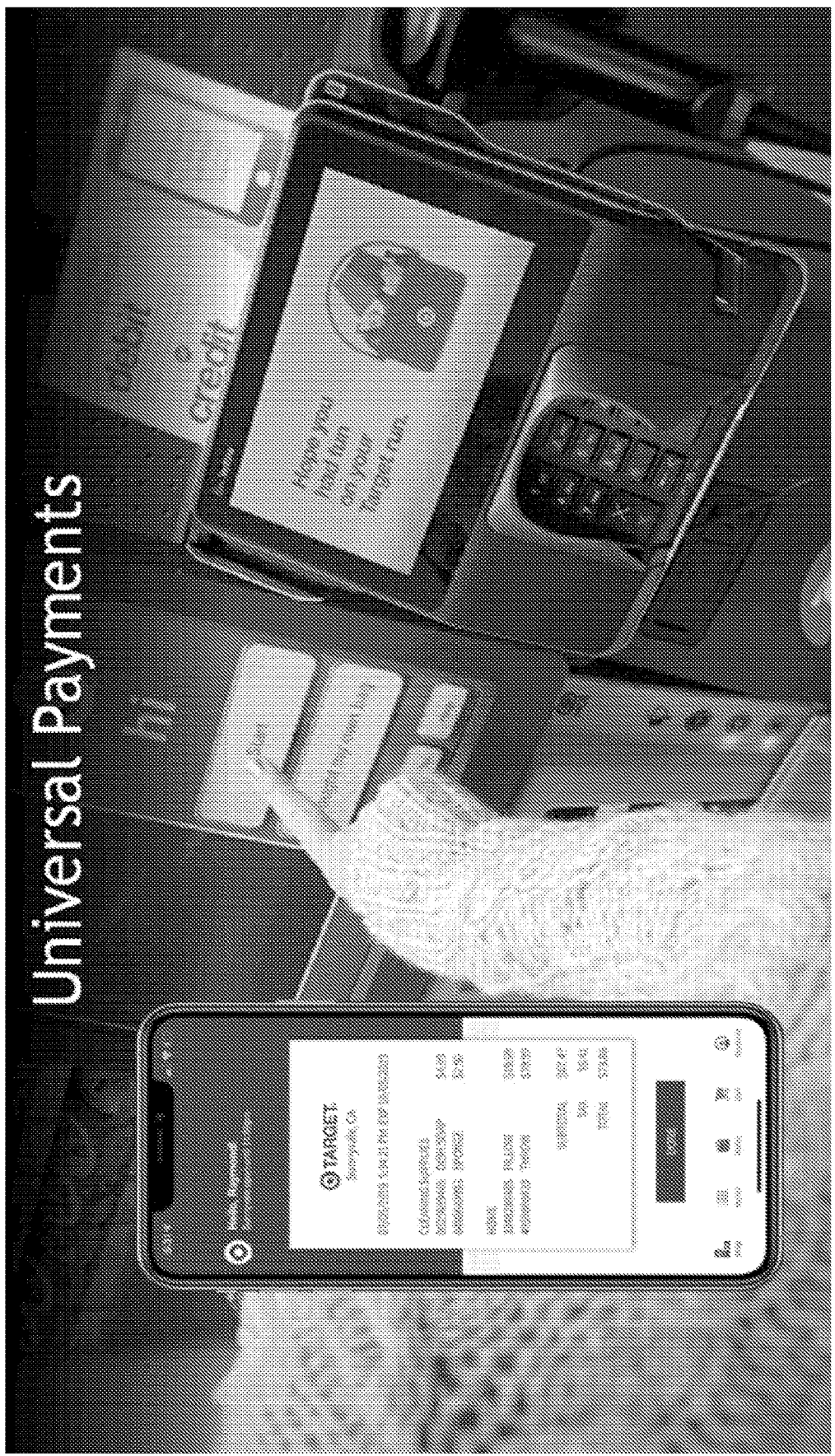
FIG. 19 is a diagram including a representation of a mobile user interface, in accordance with an embodiment of the invention, presenting universal payment interactions with a contextually driven store application.

FIG. 19 is a diagram including a representation of a mobile user interface, in accordance with an embodiment of the invention, presenting universal payment interactions with a contextually driven store application. Server processes perform universal payment interactions with the store location node and the contextually driven hotel application in accordance with FIGS. 7 and 8.

Figure 20:
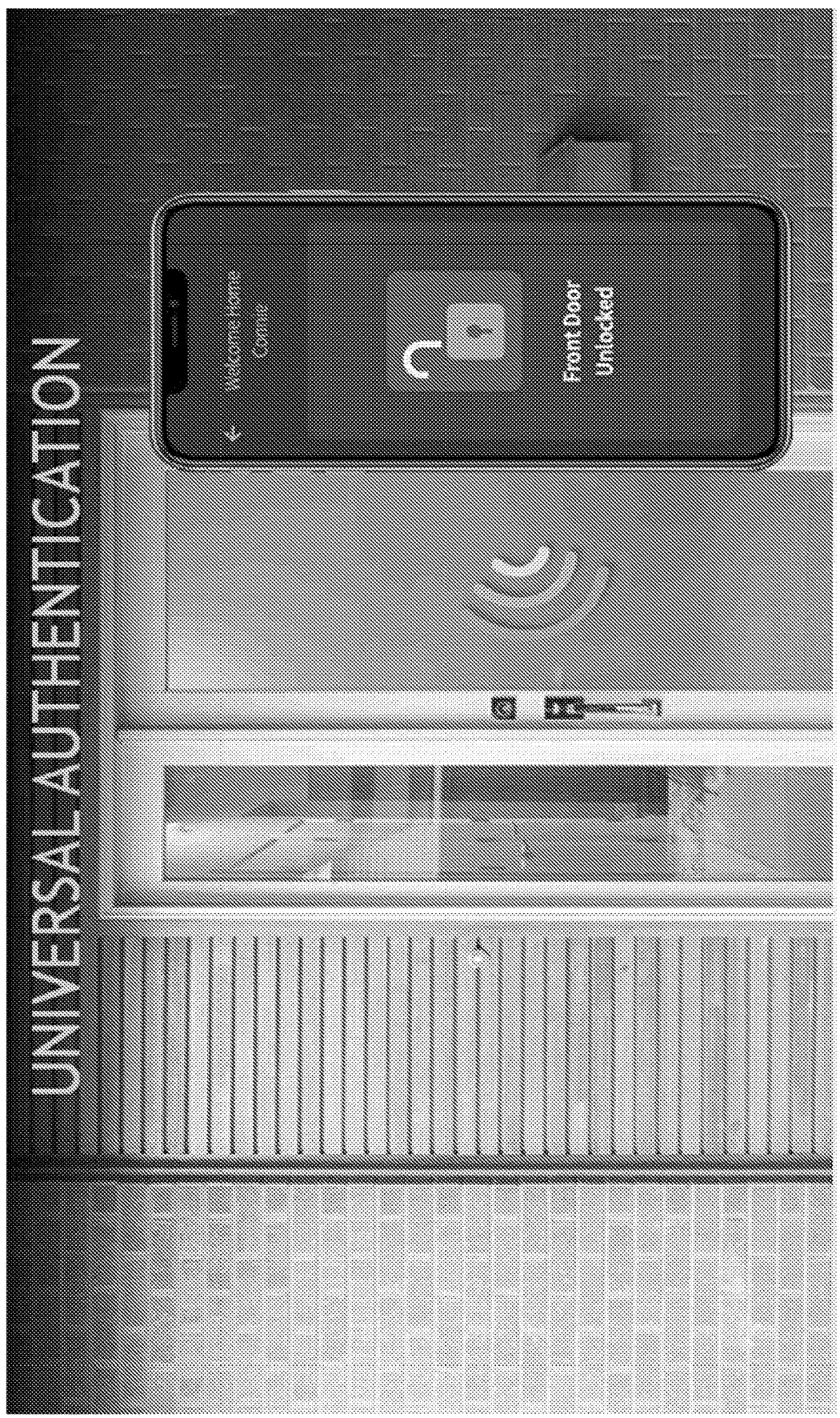
FIG. 20 is a diagram including a representation of a mobile user interface, in accordance with an embodiment of the invention, presenting universal authentication interactions with a contextually driven home security application.

FIG. 20 is a diagram including a representation of a mobile user interface, in accordance with an embodiment of the invention, presenting universal authentication interactions with a contextually driven home security application. Server processes perform universal authentication interactions with the home security location node and the contextually driven home security application in accordance with FIGS. 7 and 8.

Figure 21:
FIGS. 21-22 is a is a diagram including a representation of a mobile user interface, in accordance with an embodiment of the invention, presenting a contextually driven authentication application in response to online activities.
Figure 22:

FIGS. 21-22 is a is a diagram including a representation of a mobile user interface, in accordance with an embodiment of the invention, presenting a contextually driven authentication application in response to online activities. Server processes perform payment interactions with the online location node and the contextually driven authentication application in accordance with FIGS. 7 and 8.

Figure 23:
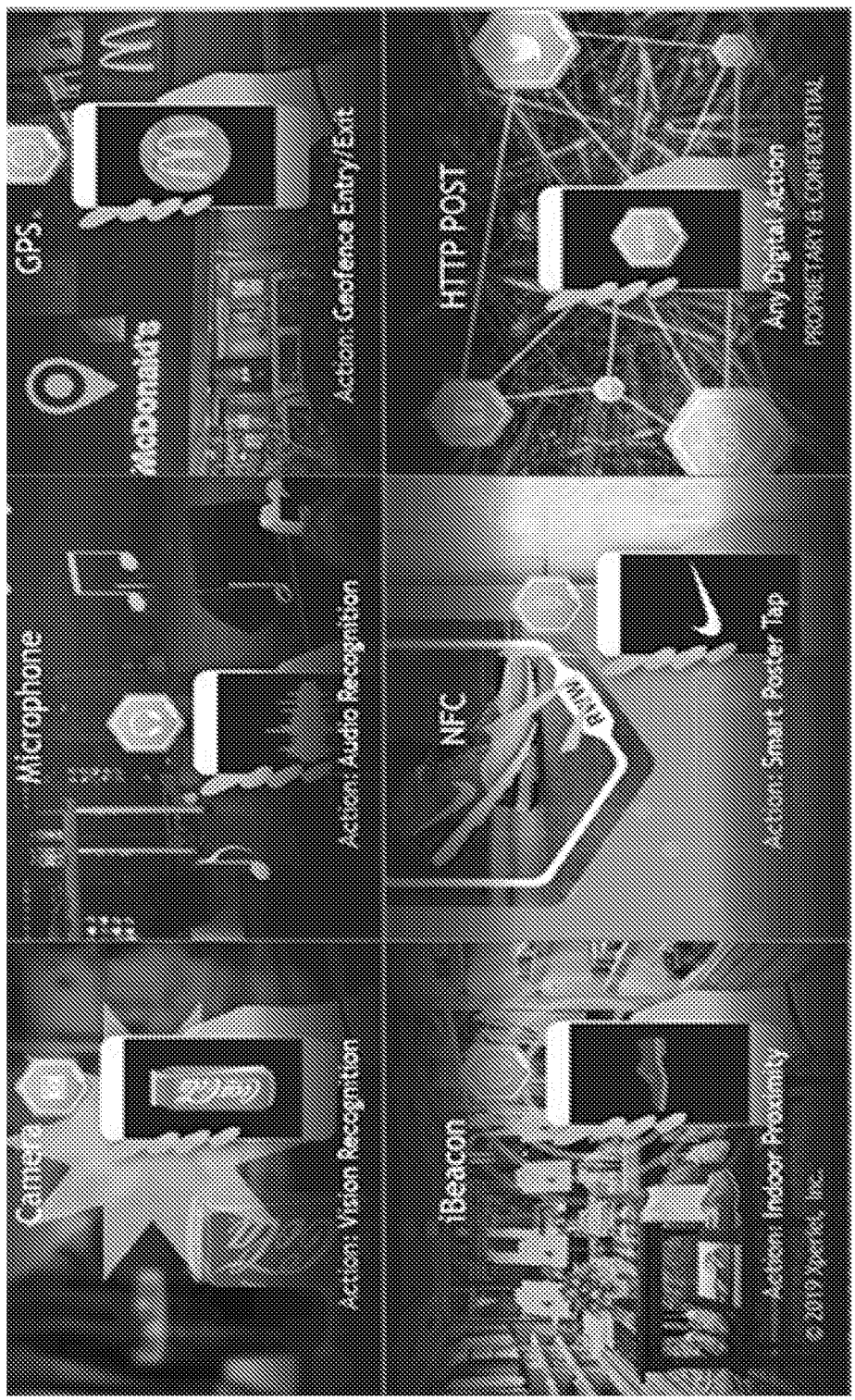
FIG. 23 is a diagram including a representation of mobile user interfaces, in accordance with an embodiment of the invention, presenting contextually driven applications in response to different triggers.

FIG. 23 is a diagram including a representation of mobile user interfaces, in accordance with an embodiment of the invention, presenting contextually driven applications in response to different triggers. Server processes implement and interact with the contextually driven applications in response to detecting the corresponding triggers in accordance with FIG. 7.

Figure 24:
FIGS. 24-26 are diagrams including a representation of mobile user interfaces, in accordance with an embodiment of the invention, presenting contextually driven advertisement applications in response to action-based triggers.
Figure 25:
Figure 26:

FIGS. 24-26 are diagrams including a representation of mobile user interfaces, in accordance with an embodiment of the invention, presenting contextually driven advertisement applications in response to action-based triggers. Server processes implement and interact with the contextually driven applications in response to detecting the corresponding action-based triggers in accordance with FIG. 7.

Figure 27:
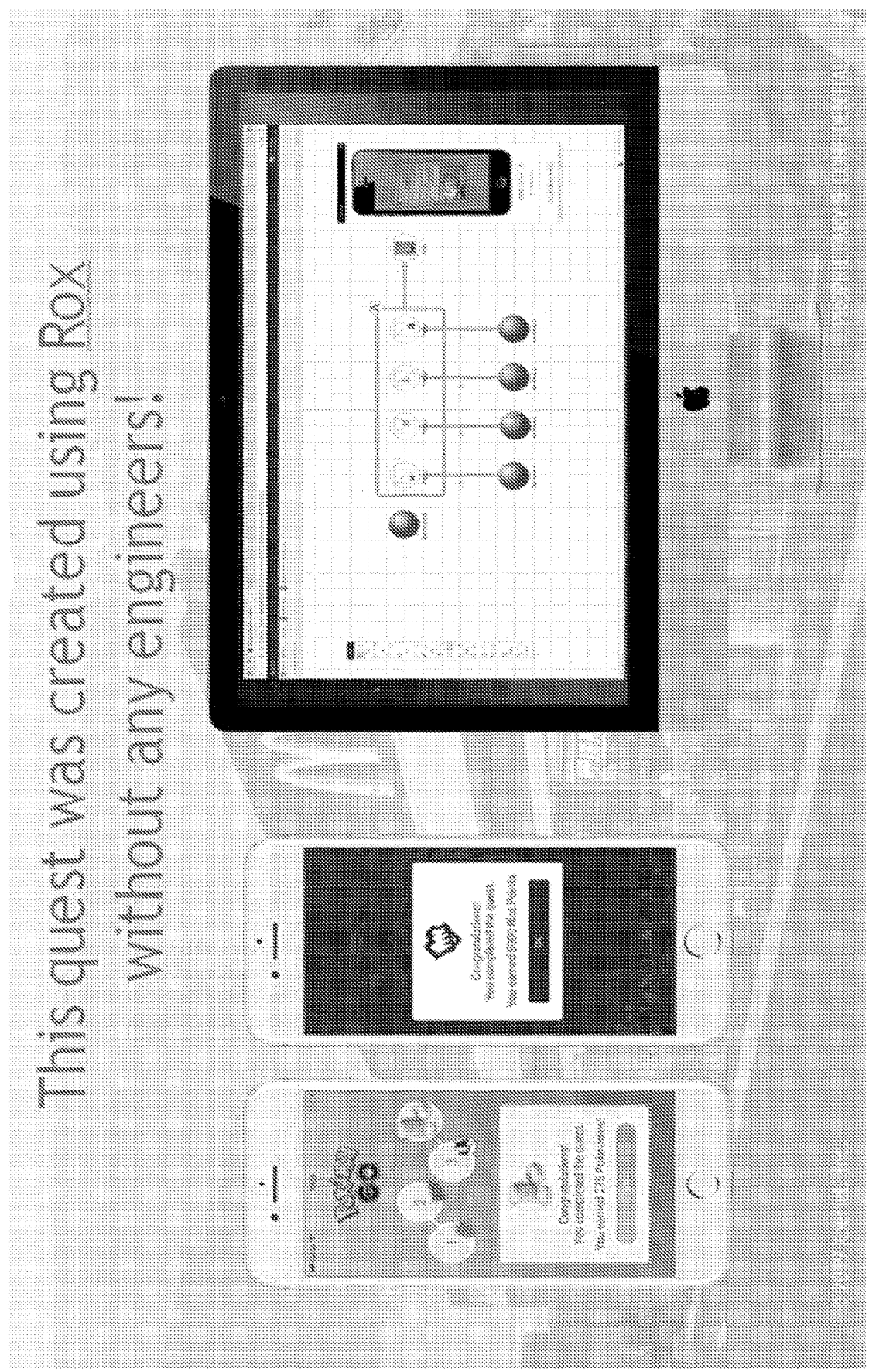
FIG. 27 is a diagram including a representation of user interfaces, in accordance with an embodiment of the invention, for developing and presenting contextually driven applications.

FIG. 27 is a diagram including a representation of user interfaces, in accordance with an embodiment of the invention, for developing and presenting contextually driven applications. FIG. 27 illustrates a screen editor (e.g., Pebbles and WYSWYG screen editor) and the contextually driven mobile applications developed the user via the screen editor.

Figure 28:
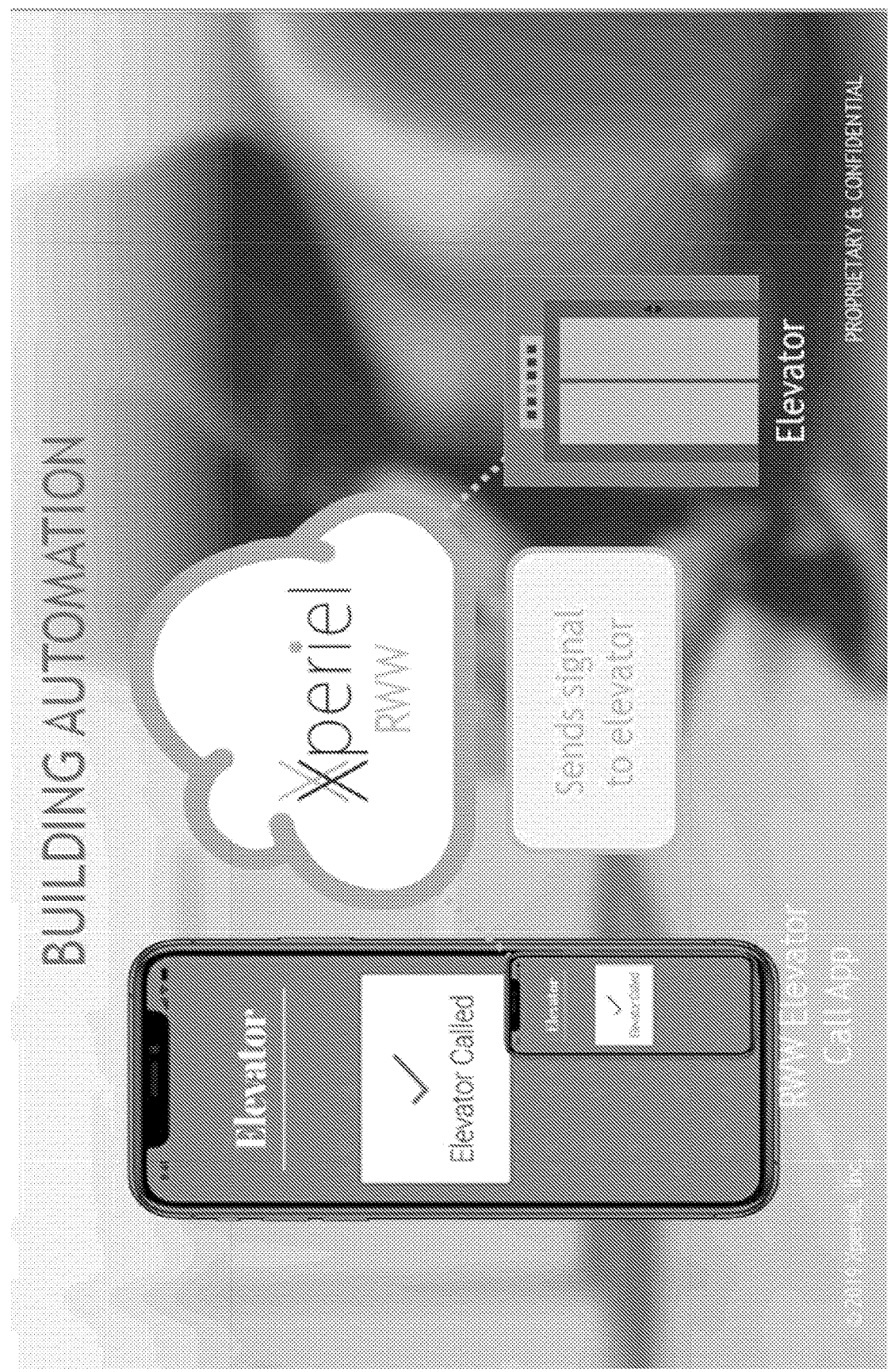
FIG. 28 is a diagram including a representation of a mobile user interface, in accordance with an embodiment of the invention, presenting automatic elevator interactions with a contextually driven elevator application.

FIG. 28 is a diagram including a representation of a mobile user interface, in accordance with an embodiment of the invention, presenting automatic elevator interactions with a contextually driven elevator application. Server processes perform automatic elevator interactions with the elevator location node and the contextually driven elevator application in accordance with FIGS. 7 and 8.

Figure 29:
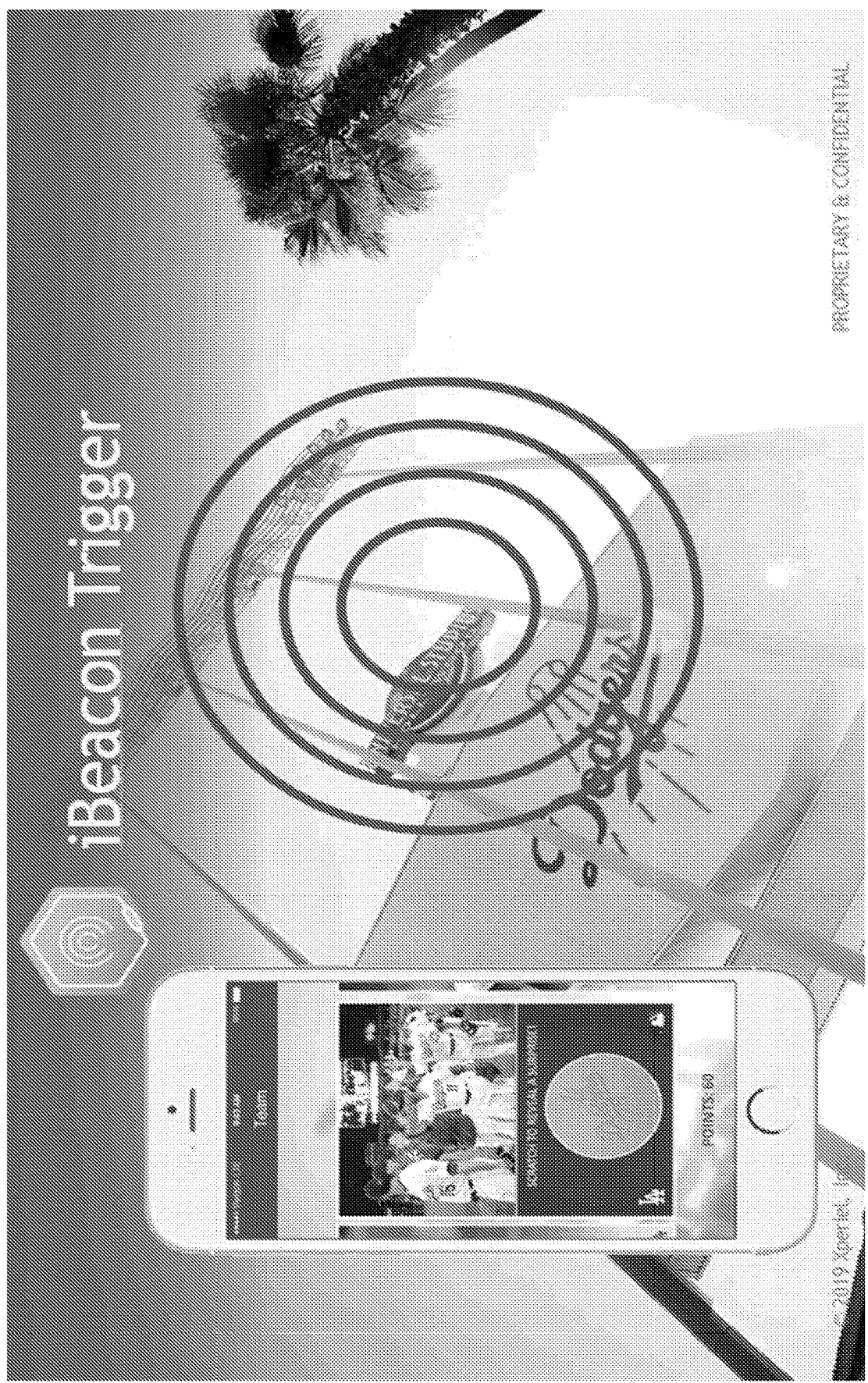
FIG. 29 is a diagram including a representation of a mobile user interface, in accordance with an embodiment of the invention, presenting a contextually driven application in response to an iBeacon trigger.

FIG. 29 is a diagram including a representation of a mobile user interface, in accordance with an embodiment of the invention, presenting a contextually driven application in response to an iBeacon trigger. Server processes implement and interact with the contextually driven application in response to detecting the iBeacon trigger in accordance with FIG. 7.

Figure 30:
FIG. 30 is a diagram including a representation of a mobile user interface, in accordance with an embodiment of the invention, presenting a contextually driven application in response to a geo trigger.

FIG. 30 is a diagram including a representation of a mobile user interface, in accordance with an embodiment of the invention, presenting a contextually driven application in response to a geo trigger. Server processes implement and interact with the contextually driven application in response to detecting the geo trigger in accordance with FIG. 7.

Figure 31:
FIG. 31 is a diagram including a representation of a mobile user interface, in accordance with an embodiment of the invention, presenting a contextually driven application in response to a ticket scan trigger.

FIG. 31 is a diagram including a representation of a mobile user interface, in accordance with an embodiment of the invention, presenting a contextually driven application in response to a ticket scan trigger. Server processes implement and interact with the contextually driven application in response to detecting the ticket scan trigger in accordance with FIG. 7.

Figure 32:
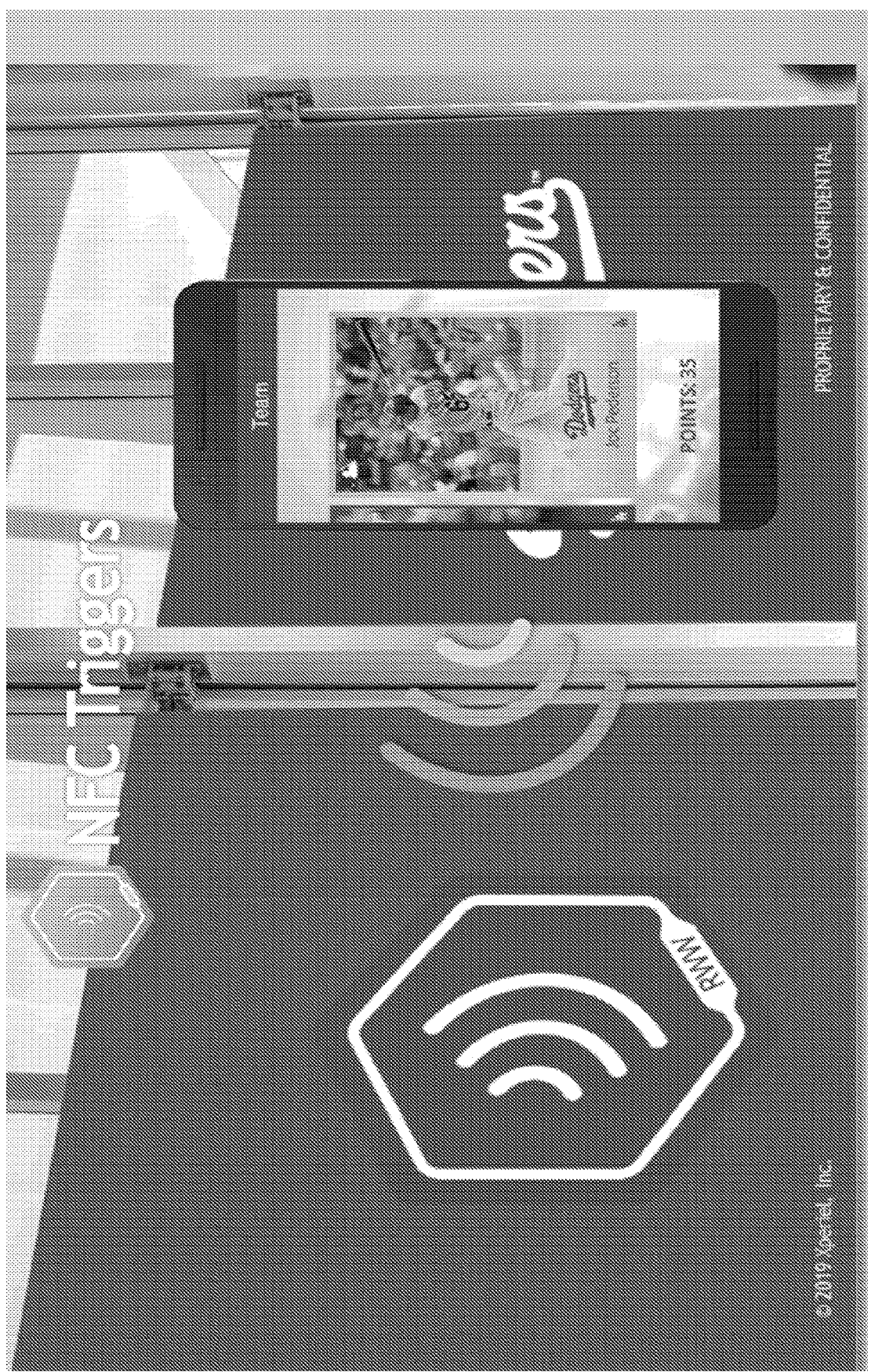
FIG. 32 is a diagram including a representation of a mobile user interface, in accordance with an embodiment of the invention, presenting a contextually driven application in response to a NFC trigger.

FIG. 32 is a diagram including a representation of a mobile user interface, in accordance with an embodiment of the invention, presenting a contextually driven application in response to a NFC trigger. Server processes implement and interact with the contextually driven application in response to detecting the NFC trigger in accordance with FIG. 7.

Figure 33:
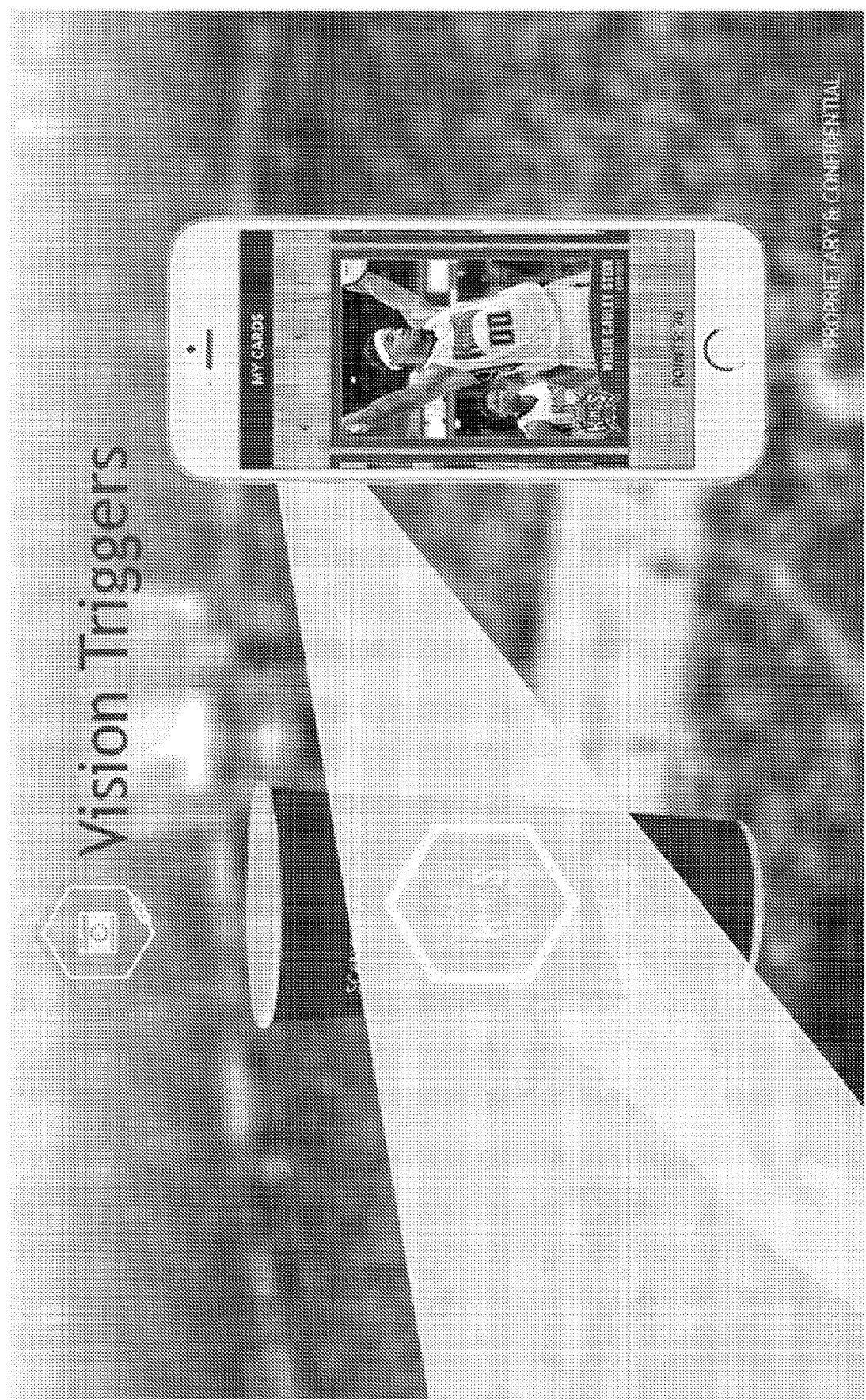
FIG. 33 is a diagram including a representation of a mobile user interface, in accordance with an embodiment of the invention, presenting a contextually driven application in response to a vision trigger.

FIG. 33 is a diagram including a representation of a mobile user interface, in accordance with an embodiment of the invention, presenting a contextually driven application in response to a vision trigger. Server processes implement and interact with the contextually driven application in response to detecting the vision trigger in accordance with FIG. 7.

Figure 34:
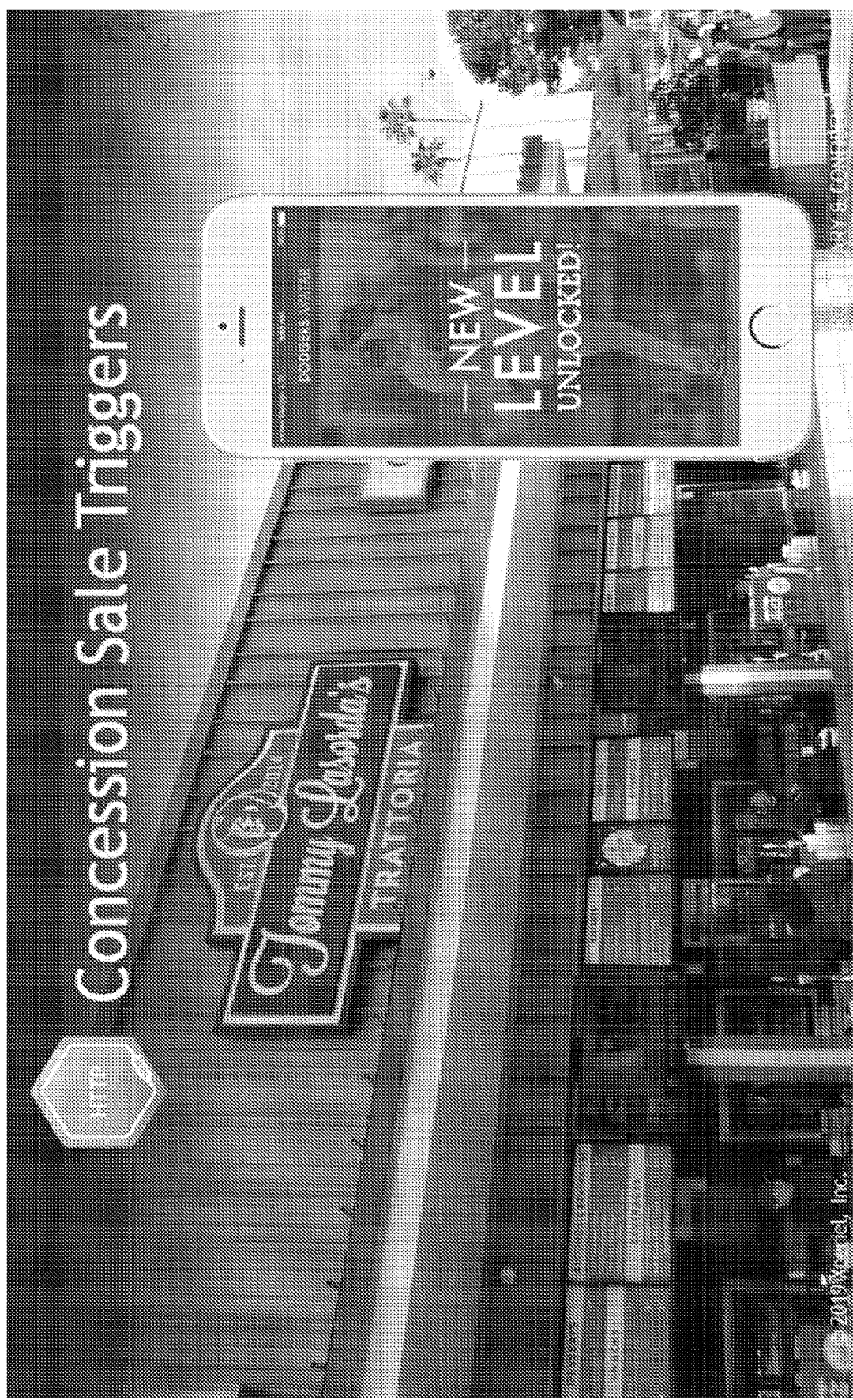
FIG. 34 is a diagram including a representation of a mobile user interface, in accordance with an embodiment of the invention, presenting a contextually driven application in response to a concession sale trigger.

FIG. 34 is a diagram including a representation of a mobile user interface, in accordance with an embodiment of the invention, presenting a contextually driven application in response to a concession sale trigger. Server processes implement and interact with the contextually driven application in response to detecting the sale trigger in accordance with FIG. 7.

Figure 35:
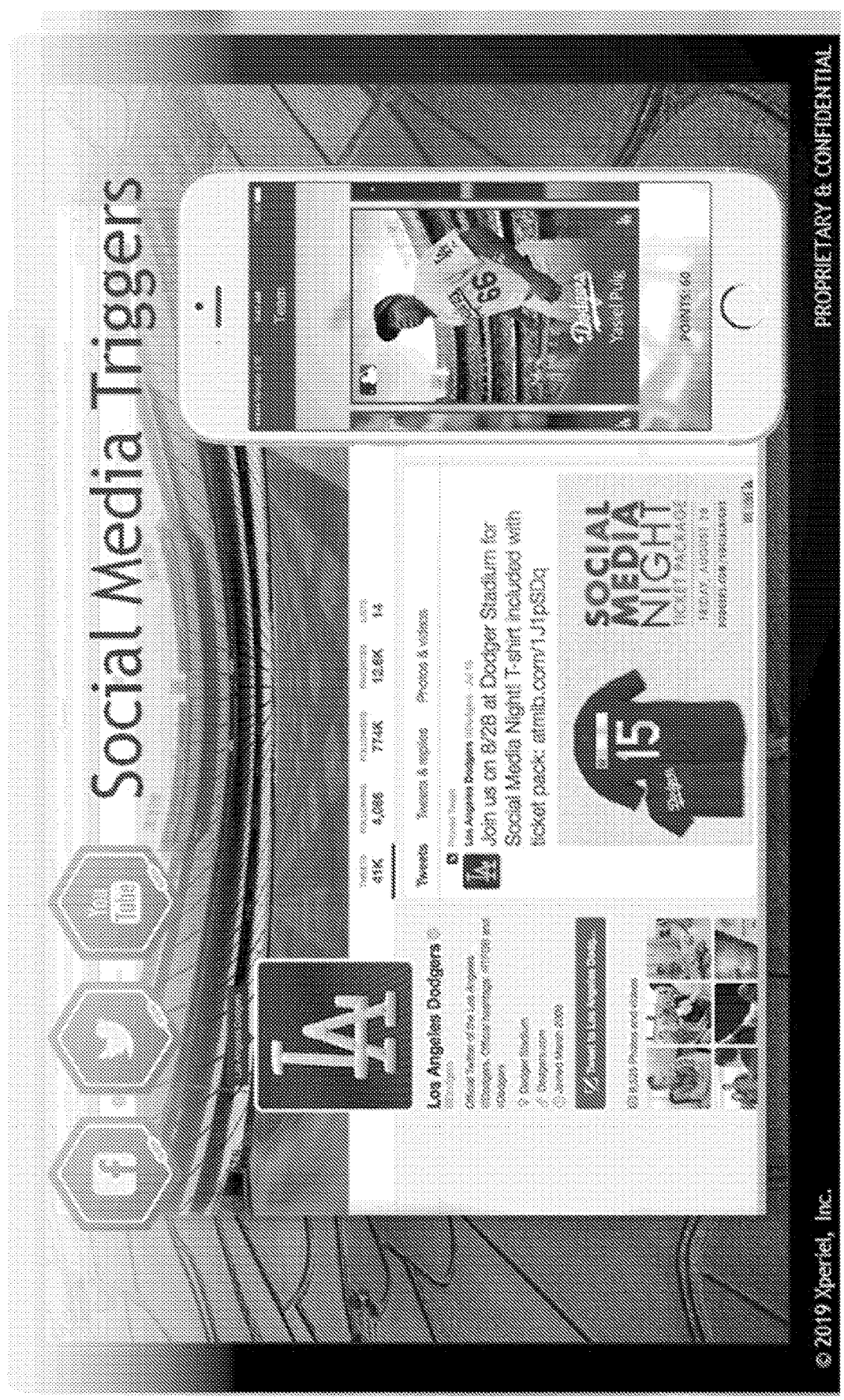
FIG. 35 is a diagram including a representation of mobile user interface, in accordance with an embodiment of the invention, presenting a contextually driven application in response to a social media trigger.

FIG. 35 is a diagram including a representation of mobile user interface, in accordance with an embodiment of the invention, presenting a contextually driven application in response to a social media trigger. Server processes implement and interact with the contextually driven application in response to detecting the social media trigger in accordance with FIG. 7.

Figure 36:
FIG. 36 is a diagram including a representation of a mobile user interface, in accordance with an embodiment of the invention, presenting a contextually driven application in response to a sports bar trigger.

FIG. 36 is a diagram including a representation of a mobile user interface, in accordance with an embodiment of the invention, presenting a contextually driven application in response to a sports bar trigger. Server processes implement and interact with the contextually driven application in response to detecting the sports bar trigger in accordance with FIG. 7.

Figure 37:
FIG. 37 is a diagram including a representation of a mobile user interface, in accordance with an embodiment of the invention, presenting a contextually driven application in response to a sponsor trigger.

FIG. 37 is a diagram including a representation of a mobile user interface, in accordance with an embodiment of the invention, presenting a contextually driven application in response to a sponsor trigger. Server processes implement and interact with the contextually driven application in response to detecting the sponsor trigger in accordance with FIG. 7.

Figure 38:
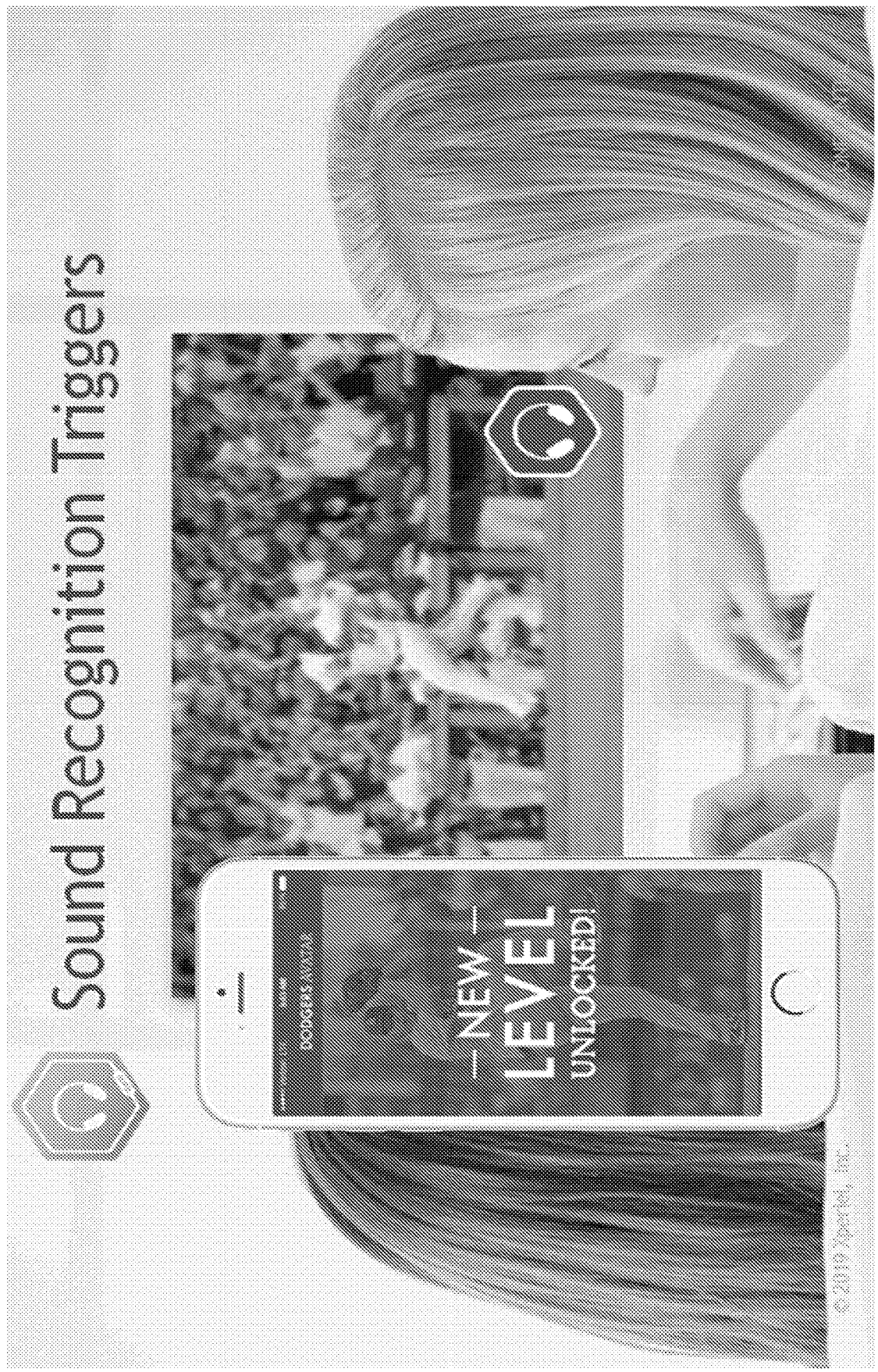
FIG. 38 is a diagram including a representation of a mobile user interface, in accordance with an embodiment of the invention, presenting a contextually driven application in response to a sound recognition trigger.

FIG. 38 is a diagram including a representation of a mobile user interface, in accordance with an embodiment of the invention, presenting a contextually driven application in response to a sound recognition trigger. Server processes implement and interact with the contextually driven application in response to detecting the sound recognition trigger in accordance with FIG. 7.

Figure 39:
FIG. 39 is a diagram including a representation of a mobile user interface, in accordance with an embodiment of the invention, presenting a contextually driven application in response to a HTTP post trigger.

FIG. 39 is a diagram including a representation of a mobile user interface, in accordance with an embodiment of the invention, presenting a contextually driven application in response to a HTTP post trigger. Server processes implement and interact with the contextually driven application in response to detecting the HTTP post trigger in accordance with FIG. 7.

Figure 40:
FIG. 40 is a diagram including a representation of a mobile user interface, in accordance with an embodiment of the invention, presenting a contextually driven application in response to a product trigger.

FIG. 40 is a diagram including a representation of a mobile user interface, in accordance with an embodiment of the invention, presenting a contextually driven application in response to a product trigger. Server processes implement and interact with the contextually driven application in response to detecting the product trigger in accordance with FIG. 7.

Figure 41:
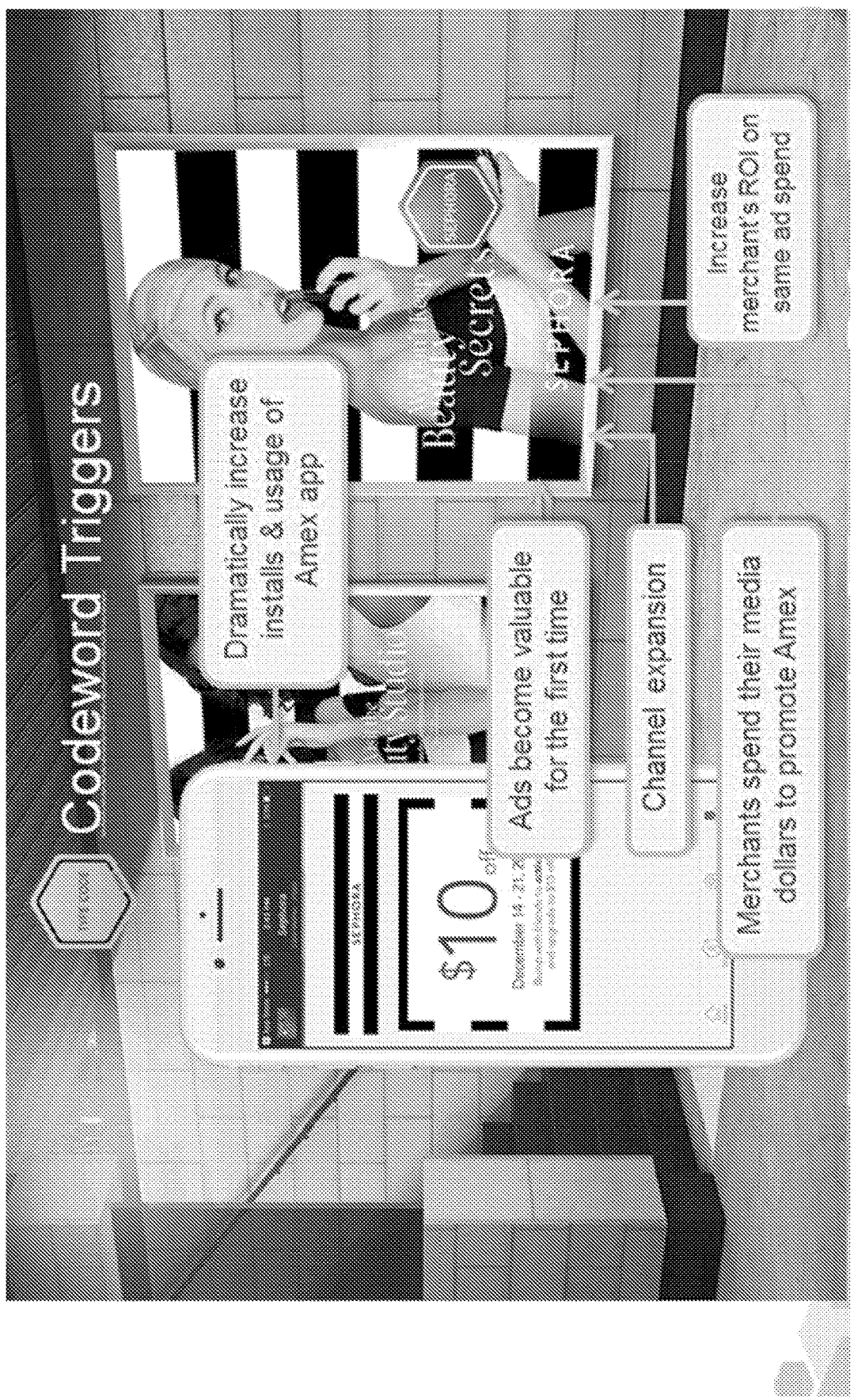
FIG. 41 is a diagram including a representation of a mobile user interface, in accordance with an embodiment of the invention, presenting a contextually driven application in response to a codeword trigger.

FIG. 41 is a diagram including a representation of a mobile user interface, in accordance with an embodiment of the invention, presenting a contextually driven application in response to a codeword trigger. Server processes implement and interact with the contextually driven application in response to detecting the codeword trigger in accordance with FIG. 7.

Figure 42:
FIG. 42 is a diagram including a representation of a mobile user interface, in accordance with an embodiment of the invention, presenting a contextually driven application in response to a peer-to-peer trigger.

FIG. 42 is a diagram including a representation of a mobile user interface, in accordance with an embodiment of the invention, presenting a contextually driven application in response to a peer-to-peer trigger. Server processes implement and interact with the contextually driven application in response to detecting the peer-to-peer trigger in accordance with FIG. 7.

Figure 43:
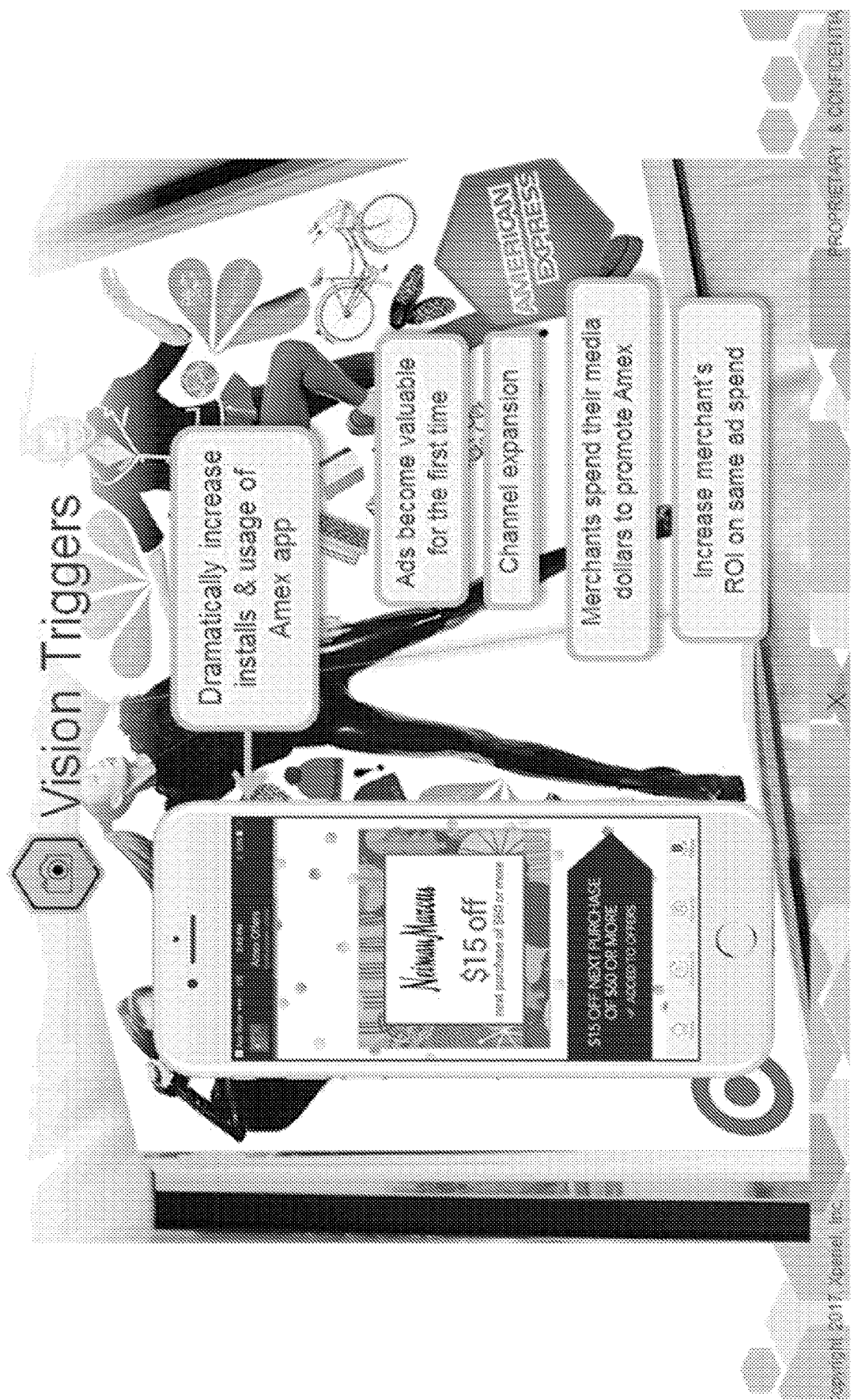
FIG. 43 is a diagram including a representation of a mobile user interface, in accordance with an embodiment of the invention, presenting a contextually driven application in response to a vision trigger.

FIG. 43 is a diagram including a representation of a mobile user interface, in accordance with an embodiment of the invention, presenting a contextually driven application in response to a vision trigger. Server processes implement and interact with the contextually driven application in response to detecting the vision trigger in accordance with FIG. 7.

Figure 44:
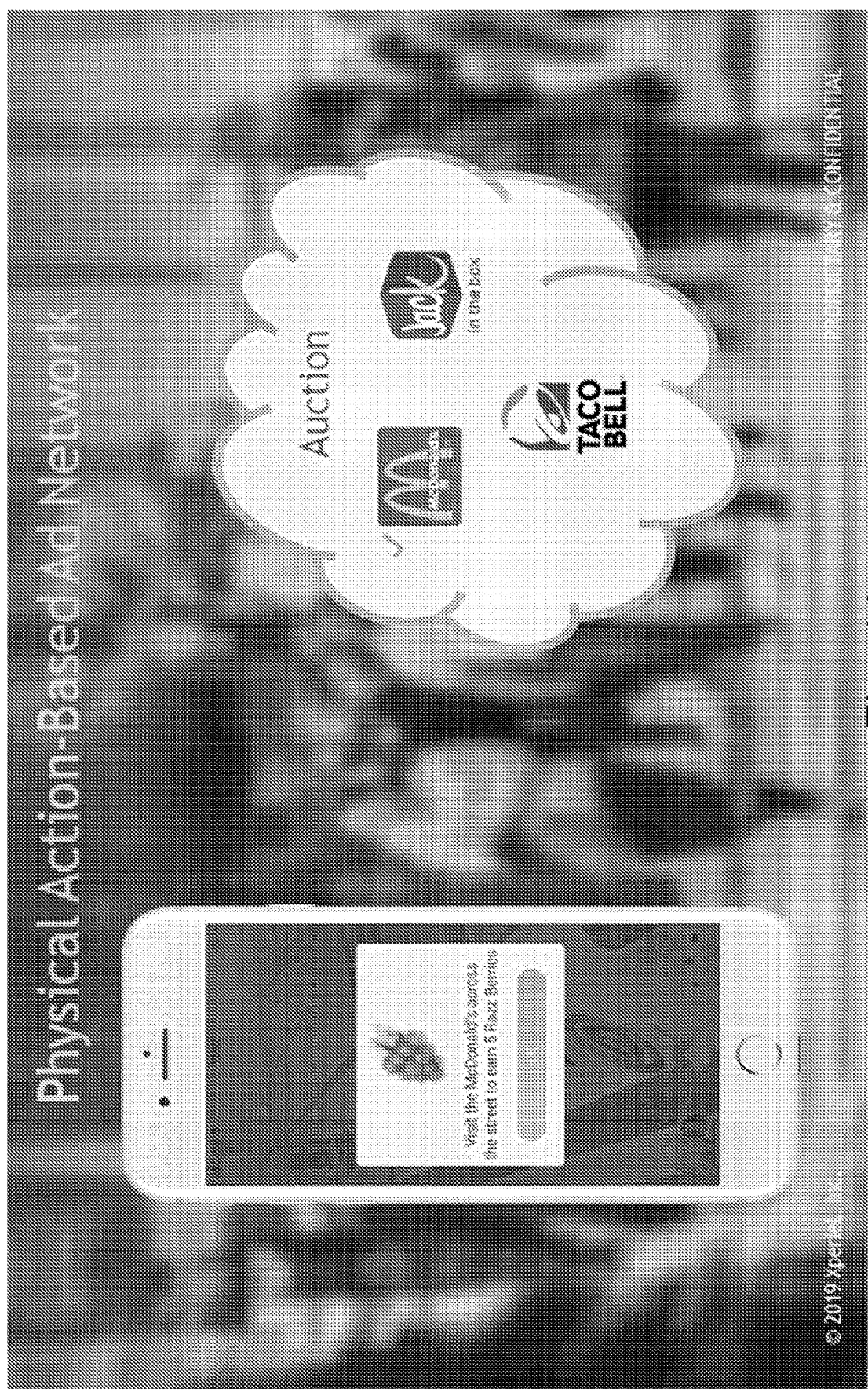
FIG. 44 is a diagram including a representation of a mobile user interface, in accordance with an embodiment of the invention, presenting a contextually driven application in response to a physical action trigger.

FIG. 44 is a diagram including a representation of a mobile user interface, in accordance with an embodiment of the invention, presenting a contextually driven application in response to a physical action trigger. Server processes implement and interact with the contextually driven application in response to detecting the physical action trigger in accordance with FIG. 7.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A server system that establishes a device-independent, contextually driven application computing environment, the server system comprising:
    a web portal that communicates with a set of client computing devices, including via a web port of a given client computing device;
    a user identification system, coupled to a user database interface, that produces an identification of a given user based on data selected from the group consisting of user login data, user biometric data, user token data, and combinations thereof;
    a sensor data interface that receives sensor data from a sensor data uploader running on the given client computing device pertaining to a physical world interaction of the given client computing device;
    a context determiner, coupled to the sensor data interface and to the user identification system and the user database interface, that processes the sensor data and the user identification, to derive a current device-independent application computing context comprising a third-party application for contextually driven interactions that are both specific to the given user and specific to a given location with respect to the portable computing device, the third-party application comprising a local browser process configured to run on the given client computing device;
    a configuration interface, coupled to the context determiner, that automatically communicates, to a configuration implementer executing in the local browser process, a current user interface configuration corresponding to the current device-independent application computing context, and causing the configuration implementer executing in the local browser process to automatically transform a user interface of the third-party application according to the current user interface configuration; and
a context module loader, coupled to the context determiner, that selects and automatically loads a selected one of a set of context modules to interact with the local browser process according to the current device-independent application computing context.

2. A server system according to claim 1, wherein the server system is selected from the group consisting of a centralized server system coupled to the internet, a distributed edge-based server system, and combinations thereof.

3. A server system according to claim 1, wherein the sensor data interface is configured to receive data from local browser processes executing on a plurality of operating systems configured on the set of client computing devices.

4. A server system according to claim 1, wherein the context determiner is configured to:
determine a set of location identifiers from the received sensor data that is generated from trigger signals indicative of a set of locations of the given client computing device;
determine whether each location identifier pertains to a location relevant for contextually driven interaction based on user preferences in a stored user profile;
if a given one of the location identifiers is determined not to pertain to such a relevant location, then prompt the user to indicate whether the given location identifier pertains to such a relevant location for contextually driven interaction; and
update the stored user profile with each location identifier determined to be pertain to a location relevant by the user.

5. A server system according to claim 1, wherein the current device-independent application computing context comprises applications that are built once and work on client computing devices regardless of operating systems.

6. A server system according to claim 1, wherein the configuration implementer automatically transforms the user interface of the third-party application according to the current user interface configuration without the third-party application being installed on the given client computing device.

7. A server system according to claim 1, further comprising:
an enrollment system, coupled to the user identification system, sensor data interface, and the user database interface, wherein the enrollment system is configured to:
receive user authentication data from the given client computing device, the authentication data selected from the group consisting of user login data, user biometric data, user token data, and combinations thereof;
generate a user identifier that is communicated to the given client computing device based on the authentication data;
receive a user profile from the given client computing device, the user profile having user preferences with assigned authentication levels; and
store the user authentication data and user profile associated with the user identifier.

8. A server system according to claim 7, wherein the user identification system is configured to:
receive login data and the user identifier from the given client computing device;
verify the login data against the stored user authentication data associated with the user identifier; and
establish a session between the server and the given client computing device.

9. A server system according to claim 1, wherein the sensor data interface is configured to determine, from the received sensor data, a location identifier that is generated from a trigger signal indicative of the given location with respect to the given client computing device.

10. A server system according to claim 9, wherein the trigger signal is selected from the group consisting of an iBeacon, a geofence, voice, audio recognition, visual recognition, hand gesture, facial expression, temperature, speed, pressure, biometrics, brain waves, barcode, SLAM triggers, a HTTP post, NFC smart poster interaction, a social media post, a location code, a codeword, a product logo, an advertisement, and combinations thereof.

11. A server system according to claim 9, further comprising:
a location node interface, coupled to the user database interface, the user context determiner, and the user ID system, that is configured to:
interact with a location node associated with the location identifier based on the current device-independent application computing context and a stored user profile; and
update the current device-independent application computing context based on the interactions with the location node.

12. A server system according to claim 11, wherein the user ID system is configured to:
determine the interactions with the location node based on the current device-independent application computing context;
determine authentication levels assigned to the interactions in a stored user profile; and
verify the authentication levels by prompting the user for authentication data.

13. A server system according to claim 12, wherein the context determiner is configured to:
use machine learning to gather information from the interactions with the location node; and
update user preferences in the user profile with the gathered information.

14. A method of interacting within a device-independent contextually driven application computing environment, the method utilizing computer processes, executed by a server system, the computer processes comprising:
receiving sensor data that is detected by a given client computing device, the sensor data pertaining to a physical world interaction of the given client computing device;
processing the sensor data and a user identification of a user based on data selected from the group consisting of user login data, user biometric data, user token data, and combinations thereof, to derive a current device-independent application computing context comprising a third-party application for contextually driven interactions that are both specific to the user and specific to a given location associated with the sensor data, the third-party application comprising a local browser process configured to run on the given client computing device;
automatically communicating a current user interface configuration to the local browser process corresponding to the current device-independent application computing context, so that the local browser process executing on the given client computing device automatically transforms a user interface of the third-party application according to the current user interface configuration; and interacting with the local browser process according to the current device-independent application computing context by selecting and automatically loading a given one of a set of context modules.

15. A method according to claim 14, wherein the sensor data is received from local browser processes executing on a plurality of operating systems configured on the set of client computing devices.

16. A method according to claim 14, wherein the computer processes further comprise:
determining a set of location identifiers from the received sensor data that is generated from trigger signals indicative of a set of locations of the portable computing device;
determining whether each location identifier pertains to a location relevant for contextually driven interaction based on user preferences in a stored user profile;
if a given one of the location identifiers is determined not to pertain to such a relevant location, then prompting the user to indicate whether the given location identifier pertains to such a relevant location for contextually driven interaction; and
updating the stored user profile with each location identifier determined to pertain to a location relevant by the user.

17. A method according to claim 14, wherein the current device-independent application computing context comprises applications that are built once and work on client computing devices regardless of operating systems.

18. A method according to claim 14, wherein the local browser process automatically transforms the user interface of the third-party application according to the current user interface configuration without the third-party application being installed on the given client computing device.

19. A method according to claim 14, wherein the computer processes further comprise:
receiving user authentication data from the given client computing device, the authentication data selected from the group consisting of user login data, user biometric data, user token data, and combinations thereof;
generating a user identifier that is communicated to the given client computing device;
receiving a user profile from the given client computing device, the user profile having user preferences with assigned authentication levels; and
storing the user authentication data and user profile associated with the user identifier.

20. A method according to claim 19, wherein the computer processes further comprise:
receiving login data and the user identifier from the given client computing device;
verifying the login data against the stored user authentication data associated with the user identifier; and
establishing a session between the server and the given client computing device.

21. A method according to claim 14, wherein the computer processes further comprise determining a location identifier from the received sensor data that is generated from a trigger signal indicative of the given location with respect to the given client computing device.

22. A method according to claim 21, wherein the trigger signal is selected from the group consisting of an iBeacon, a geofence, voice, audio recognition, visual recognition, hand gesture, facial expression, temperature, speed, pressure, biometrics, brain waves, barcode, SLAM triggers, a HTTP post, NFC smart poster interaction, a social media post, a location code, a codeword, a product logo, an advertisement, and combinations thereof.

23. A method according to claim 21, wherein the computer processes further comprise:
interacting with a location node associated with the location identifier based on the current device-independent application computing context and a stored user profile; and
updating the current device-independent application computing context based on the interactions with the location node.

24. A method according to claim 23, wherein the computer processes further comprise:
determining the interactions with the location node based on the current device-independent application computing context;
determining authentication levels assigned to the interactions in a stored user profile; and
verifying the authentication levels by prompting the user for authentication data.

25. A method according to claim 23, further comprising:
using machine learning to gather information from the interactions with the location node; and
updating user preferences in the user profile with the gathered information.

26. A tangible non-transitory computer readable storage medium encoded with instructions that, when executed by a server system establishes computer processes for interacting within a device-independent contextually driven application computing environment, the computer processes comprising:
receiving sensor data that is detected by a given client computing device, the sensor data pertaining to a physical world interaction of the given client computing device;
processing the sensor data and a user identification of a user based on data selected from the group consisting of user login data, user biometric data, user token data, and combinations thereof, to derive a current device-independent application computing context comprising a third-party application for contextually driven interactions that are both specific to the user and specific to a given location associated with the sensor data, the third-party application comprising a local browser process configured to run on the given client computing device;
automatically communicating a current user interface configuration to the local browser process corresponding to the current device-independent application computing context, so that the local browser process executing on the given client computing device automatically transforms a user interface of the third-party application according to the current user interface configuration; and
interacting with the local browser process according to the current device-independent application computing context by selecting and automatically loading a given one of a set of context modules.

27. A non-transitory computer-readable medium according to claim 26, wherein the sensor data is received from local browser processes executing on a plurality of operating systems configured on the set of client computing devices.

28. A non-transitory computer-readable medium according to claim 26, wherein the computer processes further comprise:
    determining a set of location identifiers from the received sensor data that is generated from trigger signals indicative of a set of locations of the portable computing device;
    determining whether each location identifier pertains to a location relevant for contextually driven interaction based on user preferences in a stored user profile;
    if a given one of the location identifiers is determined not to pertain to such a relevant location, then prompting the user to indicate whether each location identifier is relevant for contextually driven interaction; and
    updating the stored user profile with each location identifier determined to be pertain to a location relevant by the user.

29. A non-transitory computer-readable medium according to claim 26, wherein the current device-independent application computing context comprises applications that are built once and work on client computing devices regardless of operating systems.

30. A non-transitory computer-readable medium according to claim 26, wherein the local browser process automatically transforms the user interface of the third-party application according to the current user interface configuration without the third-party application being installed on the given client computing device.

31. A non-transitory computer-readable medium according to claim 26, the computer processes further comprising:
    receiving user authentication data from the given client computing device, the authentication data selected from the group consisting of user login data, user biometric data, user token data, and combinations thereof;
    generating a user identifier that is communicated to the given client computing device based on the authentication data;
    receiving a user profile from the given client computing device, the user profile having user preferences with assigned authentication levels; and
    storing the user authentication data and user profile associated with the user identifier.

32. A non-transitory computer-readable medium according to claim 31, wherein the computer processes further comprise:
    receiving login data and the user identifier from the given client computing device;
    verifying the login data against the stored user authentication data associated with the user identifier; and
    establishing a session between the server and the given client computing device.

33. A non-transitory computer-readable medium according to claim 26, wherein the computer processes further comprise determining a location identifier from the received sensor data that is generated from a trigger signal indicative of the given location with respect to the given client computing device.

34. A non-transitory computer-readable medium according to claim 33, wherein the trigger signal is selected from the group consisting of an iBeacon, a geofence, voice, audio recognition, visual recognition, hand gesture, facial expression, temperature, speed, pressure, biometrics, brain waves, barcode, SLAM triggers, a HTTP post, NFC smart poster interaction, a social media post, a location code, a codeword, a product logo, an advertisement, and combinations thereof.

35. A non-transitory computer-readable medium according to claim 33, wherein the computer processes further comprise:
    interacting with a location node associated with the location identifier based on the current device-independent application computing context and a stored user profile; and
    updating the current device-independent application computing context based on the interactions with the location node.

36. A non-transitory computer-readable medium according to claim 35, wherein the computer processes further comprise:
    determining the interactions with the location node based on the current device-independent application computing context;
    determining authentication levels assigned to the interactions in a stored user profile; and
    verifying the authentication levels by prompting the user for authentication data.

37. A non-transitory computer-readable medium according to claim 35, wherein the computer processes further comprise:
    using machine learning to gather information from the interactions with the location node; and
    updating user preferences in the user profile with the gathered information.

* * * * *